(12) United States Patent
Ayala et al.

(10) Patent No.: US 8,407,140 B2
(45) Date of Patent: Mar. 26, 2013

(54) GLOBAL REMITTANCE PLATFORM

(75) Inventors: Daniel I. Ayala, Antioch, CA (US);
Eugene Gutierrez, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1335 days.

(21) Appl. No.: 11/260,962

(22) Filed: Oct. 27, 2005

(65) Prior Publication Data

US 2006/0106701 A1 May 18, 2006

Related U.S. Application Data

(60) Provisional application No. 60/623,198, filed on Oct. 29, 2004.

(51) Int. Cl.
*G06Q 40/00* (2006.01)

(52) U.S. Cl. ..... 705/39; 235/385; 235/440; 235/462.13; 235/472.01; 348/348; 382/115; 382/116; 382/117; 396/18; 445/414.1; 700/225; 707/737; 707/826

(58) Field of Classification Search .................. 705/68, 705/69, 35–45; 380/9, 25, 49; 235/379, 235/380
See application file for complete search history.

(56) References Cited

U.S. PATENT DOCUMENTS

| | | | |
|---|---|---|---|
| 5,659,165 A | 8/1997 | Jennings et al. | |
| 5,774,553 A | 6/1998 | Rosen | |
| 5,783,808 A | 7/1998 | Josephson | |
| 5,787,402 A * | 7/1998 | Potter et al. | 705/37 |
| 5,825,003 A | 10/1998 | Jennings et al. | |
| 5,870,723 A * | 2/1999 | Pare et al. | 705/39 |
| 5,963,647 A * | 10/1999 | Downing et al. | 705/39 |
| 5,978,485 A | 11/1999 | Rosen | |
| 6,141,651 A * | 10/2000 | Riley et al. | 705/35 |
| 6,598,028 B1 | 7/2003 | Sullivan et al. | |
| 6,671,818 B1 | 12/2003 | Mikurak | |
| 7,177,828 B1 * | 2/2007 | Land et al. | 705/30 |
| 7,356,505 B2 * | 4/2008 | March | 705/39 |

(Continued)

FOREIGN PATENT DOCUMENTS

| | | |
|---|---|---|
| AU | 2003200649 | 9/2003 |
| EP | 1 115 079 | 7/2001 |

(Continued)

OTHER PUBLICATIONS

Walker, Leslie, E-Mail Money system QuicklyGains Currency, Business & MOney, p. D2, Oct. 12, 2000.*

(Continued)

*Primary Examiner* — Robert Niquette
(74) *Attorney, Agent, or Firm* — Foley & Lardner LLP

(57) ABSTRACT

The invention provides a remittance platform in which an enterprise, such as Wells Fargo, serves as a remittance transfer agent, where the remittance function is integrated with a bank. The invention allows access to the remittance program by both account holders with the enterprise and persons who do not have an account with the enterprise. The person accessing the service may pick the remittance service they want and the country they want. However, the service is not anchored to a particular account and can therefore work with both bank partners and non-bank partners and account holders and non-account holders. Further, the system may be private-labeled. Additionally, the invention provides a mechanism that allows one to send money easily to other countries and it allows bank partners to participate in the program easily as well. This is possible because the enterprise provides all of the processing in an integrated fashion.

19 Claims, 23 Drawing Sheets

U.S. PATENT DOCUMENTS

| | | | |
|---|---|---|---|
| 7,376,587 B1 * | 5/2008 | Neofytides et al. | 705/26.35 |
| 7,487,127 B2 * | 2/2009 | Weichert et al. | 705/40 |
| 7,516,100 B1 * | 4/2009 | Anuszewski et al. | 705/39 |
| 2001/0025265 A1 | 9/2001 | Takayasu | |
| 2001/0032181 A1 | 10/2001 | Jakstadt et al. | |
| 2001/0034682 A1 * | 10/2001 | Knight et al. | 705/35 |
| 2002/0013767 A1 | 1/2002 | Katz | |
| 2002/0016763 A1 | 2/2002 | March | |
| 2002/0016769 A1 * | 2/2002 | Barbara et al. | 705/40 |
| 2002/0026396 A1 | 2/2002 | Dent et al. | |
| 2002/0055907 A1 * | 5/2002 | Pater et al. | 705/39 |
| 2002/0062278 A1 * | 5/2002 | Ingram et al. | 705/39 |
| 2002/0062280 A1 * | 5/2002 | Zachariassen et al. | 705/39 |
| 2002/0072942 A1 | 6/2002 | Kuykendall et al. | |
| 2002/0077971 A1 | 6/2002 | Allred | |
| 2002/0087455 A1 * | 7/2002 | Tsagarakis et al. | 705/37 |
| 2002/0099656 A1 * | 7/2002 | Poh Wong | 705/40 |
| 2002/0120566 A1 | 8/2002 | Tim | |
| 2002/0152162 A1 | 10/2002 | Eda et al. | |
| 2002/0174070 A1 | 11/2002 | Eda et al. | |
| 2003/0078884 A1 * | 4/2003 | Bauman | 705/39 |
| 2003/0105710 A1 * | 6/2003 | Barbara et al. | 705/39 |
| 2003/0177092 A1 | 9/2003 | Paglin | |
| 2003/0182230 A1 | 9/2003 | Pessin | |
| 2003/0208440 A1 * | 11/2003 | Harada et al. | 705/39 |
| 2003/0220855 A1 | 11/2003 | Lam et al. | |
| 2003/0220858 A1 | 11/2003 | Lam et al. | |
| 2003/0220875 A1 | 11/2003 | Lam et al. | |
| 2003/0220886 A1 | 11/2003 | Lam et al. | |
| 2003/0225678 A1 * | 12/2003 | Understein | 705/37 |
| 2003/0233317 A1 * | 12/2003 | Judd | 705/39 |
| 2003/0233318 A1 * | 12/2003 | King et al. | 705/39 |
| 2003/0233319 A1 | 12/2003 | Lawrence | |
| 2003/0236726 A1 | 12/2003 | Almonte et al. | |
| 2004/0006540 A2 | 1/2004 | Paglin | |
| 2004/0034594 A1 | 2/2004 | Thomas et al. | |
| 2004/0064409 A1 * | 4/2004 | Kight et al. | 705/40 |
| 2004/0093307 A2 | 5/2004 | Paglin | |
| 2004/0098335 A1 | 5/2004 | Michelson et al. | |
| 2004/0111367 A1 * | 6/2004 | Gallagher et al. | 705/39 |
| 2004/0117303 A1 * | 6/2004 | Gamboa | 705/40 |
| 2004/0133509 A1 | 7/2004 | McCoy et al. | |
| 2004/0138973 A1 | 7/2004 | Keis et al. | |
| 2004/0139014 A1 * | 7/2004 | Song et al. | 705/40 |
| 2004/0143621 A1 | 7/2004 | Fredrickson et al. | |
| 2004/0148252 A1 | 7/2004 | Fleishman | |
| 2004/0153403 A1 | 8/2004 | Sadre | |
| 2005/0097017 A1 * | 5/2005 | Hanratty | 705/35 |
| 2005/0131813 A1 * | 6/2005 | Gallagher et al. | 705/39 |
| 2005/0222957 A1 * | 10/2005 | Understein | 705/43 |
| 2006/0287953 A1 * | 12/2006 | Chauhan | 705/39 |
| 2007/0050291 A1 * | 3/2007 | Avazian et al. | 705/42 |
| 2009/0063331 A1 * | 3/2009 | Rodin | 705/39 |

FOREIGN PATENT DOCUMENTS

| | | |
|---|---|---|
| KR | 2003012067 | 2/2003 |
| WO | WO 00/30053 | 5/2000 |
| WO | WO 01/75557 | * 10/2001 |

OTHER PUBLICATIONS

Good, Barbara. Bringing the Unbanked Onboard. Federal Reserve Bank of Cleveland. © 1999.*

Lockett, A., et al. The Formation of a Virtual Global Bank. European Journal of Info. Systems. vol. 5. No. 2. Jun. 1996. U.K.

Holland, C., et al. Strategy and Structure of International Funds Transfer Systems. Proc. 29th Hawaii Intl. Conference on System Sciences. vol. 4. 1996. USA.

Banks Launch Global Mass Funds Transfer. Banking World vol. 10. No. 11. Nov. 1992. UK.

Le Tellier, H. Swift: the Darling of the Banks . . . and Others (Electronic Funds Transfer. Resources Informatique No. 8. Mar. 1985. France.

International Money Transfer with Paystone. http://www.paystone.com/remittance.

International Remittance Network (IRNET): Money Transfers You Can Trust. https://www.woccu.org/prod_serv/irnet/index.php. World Council of Credit Unions, Inc. 2003.

Baljko, J. Integration Software Strengthens E-Commerce at Toronto-Dominion. Bank Systems + Technology. vol. 34. No. 9. Sep. 1997. USA.

Jones, D. Bank of Scotland Goes it Alone with EDI. Banking World. Dec. 1991. UK.

Willmott, K. Getting Rid of the Paperwork (banking). ICL Today. vol. 5. No. 11. Aug. 1990 UK.

Zimmermann, K. MHT Brings Technology to In'l Processing. Bank Systems & Equipment. vol. 26. No. 3. Mar. 1989. USA.

Guldentops, E. Security and Control in Electronic Funds Transfer: the SWIFT Case. EDPACS vol. 18. No. 10. Apr. 1991. USA.

Rowe, H. Legal Issues Between Banks Sharing Networks. Computer Law & Practice. vol. 7. No. 1. Sep.-Oct. 1990 UK.

Fairley, J. Funds Transfer on a PC. Communicate. Nov. 1987. UK.

Clement-Jones, J. Digital Network Architectures Related to Electronic Funds Transfer. Digital Networks and their Evolution, Space and Terrestrial Systems. 33rd Intl. Conference on Elec./26th Intl. Mtg. on Space Joint Conference. 1986. Italy.

Granado, J., et al. The Portuguese Interbank Network for Electronic Funds Transfer. Electronic Banking and Finance. vol. 2. No. 7. Sep. 1985 The Netherlands.

Berkvens, J. Informatie. vol. 25. No. 9. Sep. 1983. The Netherlands.

Repton, C., et al. Electronic Funds Transfer in the USA and Europe. Communications International. vol. 10. No. 6. Jun. 1983. UK.

Saxton, W., et al. EFT Already Dominates in North America. Canadian Datasystems. vol. 11. No. 5. May 1979. Canada.

International Money Transfer Consumer Guide. http://www.international-money-transfer-consumer-guide.info.

International Remittance Initiative, Technical Assitance Guidelines. National Credit Union Administration. Alexandria, VA. 2004.

Stevens, E. Non-Par Banking: Competition and Monopoly in Markets for Payments Services. Working Paper 9817. Federal Reserve Bank of Cleveland. Nov. 1998.

A Technical Guide to Remittances: The Credit Union Experience. https://www.woccu.org/development/rural_finance/index.php; World Council of Credit Unions, Inc. 2003.

International Remittance Service. http://www.yu-cho.japanpost.jp/e_s0000000/ssk20000.htm.

Harry Terris, Wells' Remitance Slice Is Growing, Even If Pie Isn't, American Banker, The Financial Services Daily, vol. 173, No. 112, Jun. 11, 2008, 2 pages.

William Launder, Wells Fargo in Remittance 'Seal of Approval' Test, Factiva, Dow Jones, vol. 172, No. 71, Apr. 13, 2007, 2 pages.

U.S. Remittance Fees Eliminated for Sending Money to China for Earthquake, China Sourcing News, May 20, 2008, 2 pages.

Wells Fargo Eliminates Remittance Transfer Fees to China for Families and Friends Affected by the Earthquake, PR Newswire—Press Release, Forbes.com, May 14, 2008, 2 pages.

Wells Fargo Unveils Money Transfer Program, FoxNews.com, Jul. 17, 2007, 2 pages.

Nancy Feig, Banks Adopting More Strategies to Court Underbanked, Bank Systems & Technology, Mar. 27, 2008, 2 pages.

Wells Fargo offers new program for money transfers to Mexico, elsewhere, Associate Press Newswires, Jul. 17, 2007, 2 pages.

Julie Chan, Wells Fargo enhances money transfer service, Banking Business Review Online, Jul. 18, 2007, 1 page.

Wells Fargo Launches Enhanced Remittance Service, Payments News, Jul. 17, 2007, 2 pages.

Wells Fargo Unveils Money Transfer Program, Associated Press, Jul. 17, 2007, 1 page.

Latina Enterprise, Terra Networks and V-me Create Innovative Sales and Content Alliance, Jul. 17, 2007, 3 pages.

HispanicTrending, Wells Fargo Launches Enhanced Remittance Service; Offers Zero Dollar Transaction Fee, Jul. 17, 2007, 2 pages.

CUNA News Now, News of the Competition, Jul. 19, 2007, 1 page.

Thestar online, Wells Fargo offers new program for money transfers to Mexico, Jul. 17, 2007, 2 pages.

Hispania News, Negocios, Wells Fargo Launches Enhanced Remittance Service; Offers Zero Dollar Transaction Fee, Jul. 26- Aug. 2, 2007, 1 page.

Factiva, eBanking & Payment News, Wells Fargo launches enhanced remittance service, Aug. 30, 2007, 1 page.

Factiva, Cards International, Latin America: ExpressSend service launch, Jul. 28, 2007, 1 page.

Factiva, Global Banking News, Wells Fargo launches new express remittance service, Jul. 18, 2007, 1 page.

Factiva, Reuters Significant Developments, Wells Fargo & Co. Offers New Program for Foreign Transfers-AP, Jul. 17, 2007, 1 page.

Yahoo, Wells Fargo Eliminates Remittance Transfer Fees to China for Families and Friends Affected by the Earthquake, May 14, 2008, 1 page.

San Francisco Business Times, Wells Fargo assists China quake victims with fee waiver, other measures, May 14, 2008, 1 page.

China—VerticalNews.com, Wells Fargo Eliminates Remittance Transfer Fees to China for Families and Friends Affected by the Earthquake, May 26, 2008, 1 page.

Professional Manufacturer for Plastic Recycling machine, Wells Fargo Eliminates Remittance Transfer Fees to China for Families and Friends Affected by the Earthquake, May 15, 2008, pages.

China Sourcing News, U.S. Remittance Fees Eliminated for Sending Money to China for Earthquake, May 20, 2008, 2 pages.

United Business Media, Bank Systems & Technology, Eyes on the Prize, Apr. 2008, 7 pages.

* cited by examiner

GLOBAL REMITTANCE PLATFORM

CROSS-REFERENCE TO RELATED APPLICATIONS

This application claims priority to U.S. Provisional Patent Application Ser. No. 60/623,198, filed on Oct. 29, 2004, which application is incorporated herein in its entirety by the reference thereto.

BACKGROUND OF THE INVENTION

1. Technical Field

The invention relates to remittances. More particularly, the invention relates to a system and process for a global remittance platform not anchored to a particular account and can therefore work with both bank partners and non-bank partners, and account holders and non-account holders.

2. Description of the Prior Art

With the advent of the information age and of the Internet, globalization is affecting many aspects of an individual's lifestyle. As each decade passes, previously unimaginable improvements are created upon the previous decade's advances. With respect to increased global mobility, workers are finding themselves working in one country but wanting to deposit a portion of or all of their income into an account in a different country, typically the country of origin.

It is possible today for a bank customer to open an account in a first bank in a first country that has a business relationship with a second bank in a second country. It is possible for same customer to link the first account to a second account in the second bank so that an international deposit, or remittance, can be effected. Of course, the transfer of funds has to take into account exchange rates, domestic and international regulation and compliance, and so on.

H. Jennings, N. Pinnell, K. Do, V. Shah, M. Profumo, J. Downing, N. Goodhand, M. Maino, and M. H. Thompson, U.S. Pat. No. 5,659,165, CUSTOMER-DIRECTED, AAUTOMATED PROCESS FOR TRANSFERRING FUNDS BETWEEN ACCOUNTS VIA A COMMUNICATIONS NETWORK, (Aug. 19, 1997) discusses a way to transfer funds between accounts via a communications network and, in particular, across international borders and in different currencies. Jennings et al discuss a system for transferring funds instantly to an account maintained in the same or another bank business through the use of a terminal such as an ATM, home banking phone, personal computer, conventional telephone or the like. The system allows funds to be transferred to an account based on customer information, which can be automatically accessed by the system, rather than needing to be manually entered. Further, the system automatically computes the appropriate exchange rate and any fees to be charged to the account and displays them to the user so that the user may authorize or cancel the transaction. The disclosure discusses analyzing the parameters of the transfer for conformance with pertinent government regulations. The disclosure discusses the user to quantify the amount to be transferred in the currency of the originating account or the currency of the receiving account. The disclosure discusses being designed so that it can be understood and accessed by individuals having no special expertise in computers, wire transfers and the like. Finally, the disclosure discusses various safeguards to assure that only authorized individuals have access to the accounts and the funds. However, the teachings require an account-to-account transfer.

Currently, it is also possible that an individual can transfer a particular amount of cash in a single transaction to an associated site in a second and different country where a second individual can retrieve the cash, assuming incorporating an exchange rate and other requirements. As example of such a business is Western Union, owned by Western Union Holdings, Inc.

However, people are getting increasingly savvy and expect almost instant gratification. They want more options and without hassles.

It would be advantageous to provide an integrated system and process that is more flexible and integrates and offers an anything to anything type of remittance.

It would be advantageous to provide an integrated system and process that is more flexible and integrates and offers any of the following types of global remittances: account to account, account to cash, cash to account, and cash to cash.

It would further be advantageous for such an integrated system and process to allow bank partners of an enterprise to participate in a global remittance program.

It would further be advantageous for such an integrated system and process to be private-labeled, e.g. on behalf of the bank but using the infrastructure of the enterprise.

It would further be advantageous for such an integrated system and process to provide a dynamic transaction disclosure receipt (DTDR) that provides all the details of an individual's transaction.

SUMMARY OF THE INVENTION

The invention provides a remittance platform in which an enterprise, such as Wells Fargo, serves as a remittance transfer agent, where the remittance function is integrated with a bank. The invention allows access to the remittance program by both account holders with the enterprise and persons who do not have an account with the enterprise. The person accessing the service may pick the remittance service they want and the country they want. However, the service is not anchored to a particular account and can therefore work with both bank partners and non-bank partners and account holders and non-account holders. The service is an Anything-to-Anything remittance service. Further, the system may be private-labeled. Additionally, the invention provides a mechanism that allows one to send money easily to other countries and it allows bank partners to participate in the program easily as well. This is possible because the enterprise provides all of the processing in an integrated fashion.

DETAILED DESCRIPTION OF THE INVENTION

The invention provides a remittance platform in which an enterprise, such as Wells Fargo, serves as a remittance transfer agent, where the remittance function is integrated with a bank. The invention allows access to the remittance program by both account holders with the enterprise and persons who do not have an account with the enterprise. The person accessing the service may pick the remittance service they want and the country they want. However, the service is not anchored to a particular account and can therefore work with both bank partners and non-bank partners and account holders and non-account holders. The service is an Anything-to-Anything remittance service. Further, the system may be private-labeled. Additionally, the invention provides a mechanism that allows one to send money easily to other countries and it allows bank partners to participate in the program easily as well. This is possible because the enterprise provides all of the processing in an integrated fashion.

Figure 1:
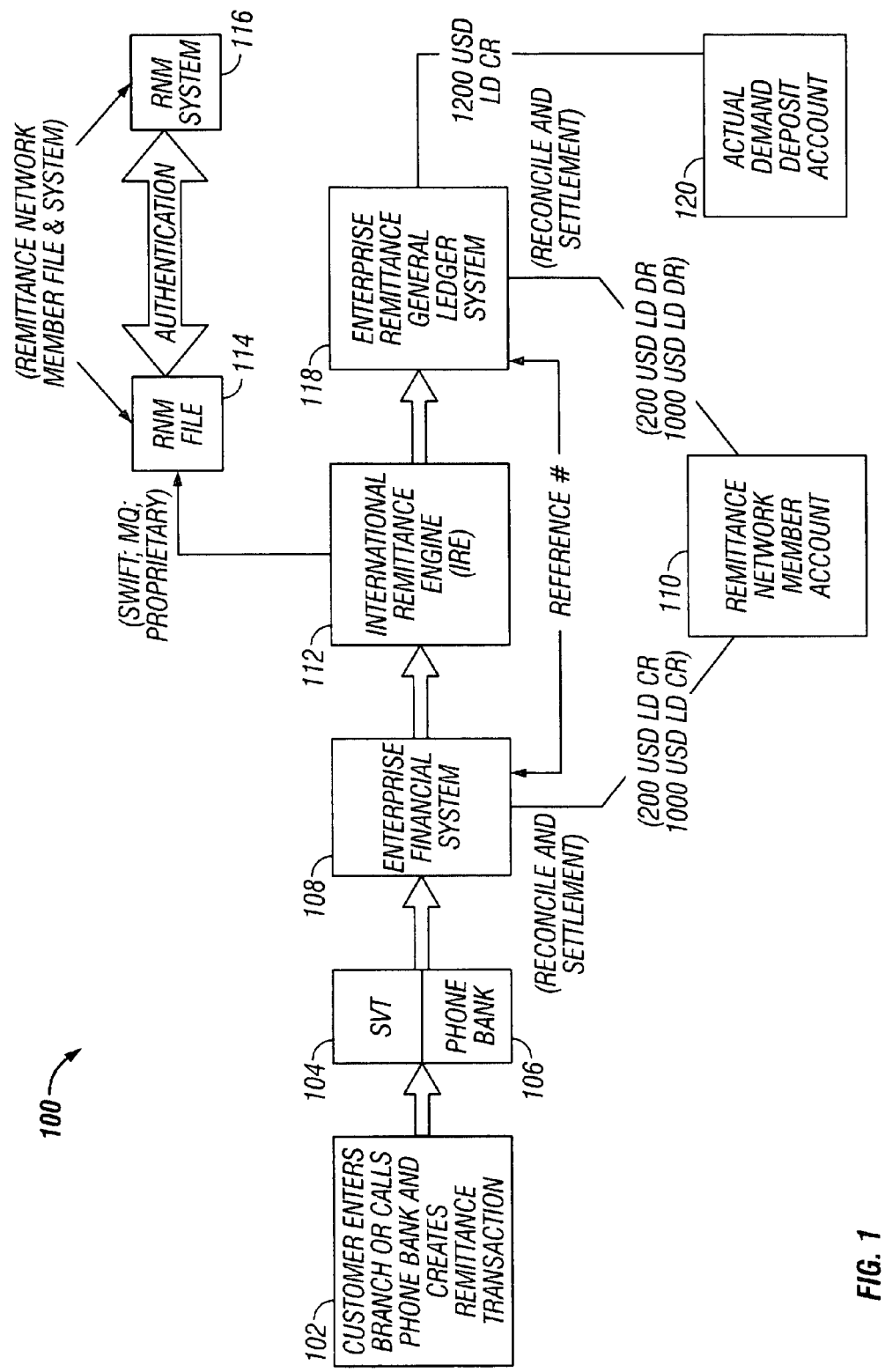
FIG. 1 is a block schematic diagram showing a system according to the invention.

One embodiment of the invention can be described with reference to FIG. 1, is a block diagram showing an overview of the system 100. A customer can enter a branch of an enterprise, such as Wells Fargo, or call up the enterprise's phone bank to creates a foreign exchange remittance transaction 102. If the customer walks into the branch office, then the remittance transaction is made using a global remittance platform, also referred to herein as Store Vision Teller (SVT) 104 as described hereinbelow. Otherwise, the customer calls into the phone bank 106 to initiate a remittance transaction. The request for the foreign exchange remittance transaction is sent in the form of a message to the enterprise financial system 108. The enterprise financial system 108 sends reconcile and settlement messages including the transactional information to a remittance network member account 110 for verification. Such account resides in the enterprise infrastructure. As well, the enterprise financial system 108 sends the transactional information to an international remittance engine (IRE) 112 that is also part of the enterprise infrastructure. The IRE sends the transactional information outside of the enterprise infrastructure via SWIFT, MQ, or other proprietary messaging functionality, in a remittance network member file 114. Such file 114 is authenticated and received by an associated remittance network member system 116. As well, the IRE sends the transactional information to the enterprise's remittance general ledger (GL) system 118. The enterprise remittance GL system 118 processes the transaction informational and sends a different reconcile and settlement message to the enterprise remittance network member account 110. It should be appreciated that the transactional information sent to the remittance network member account 110 from both the enterprise financial system 108 and the enterprise remittance GL system 118 should match. If they match, the enterprise remittance GL system 118 makes funds available on an aggregate level in the actual demand deposit account 120.

It should be appreciated that for ease of understanding, the global remittance platform 104 is used herein interchangeably as Store Vision Tell (SVT). The global remittance platform comprises middleware subsystems and enterprise teller functions. SVT can be thought of as a specific system which the tellers use to start a transaction, but there are other middleware subsystems that can facilitate gathering other information. An example of a middleware subsystem is a system used to determine account eligibility and the like. Collectively, such middleware subsystems, teller actions using such systems can be referred to as SVT, global remittance platform, or teller using SVT.

Figure 2:
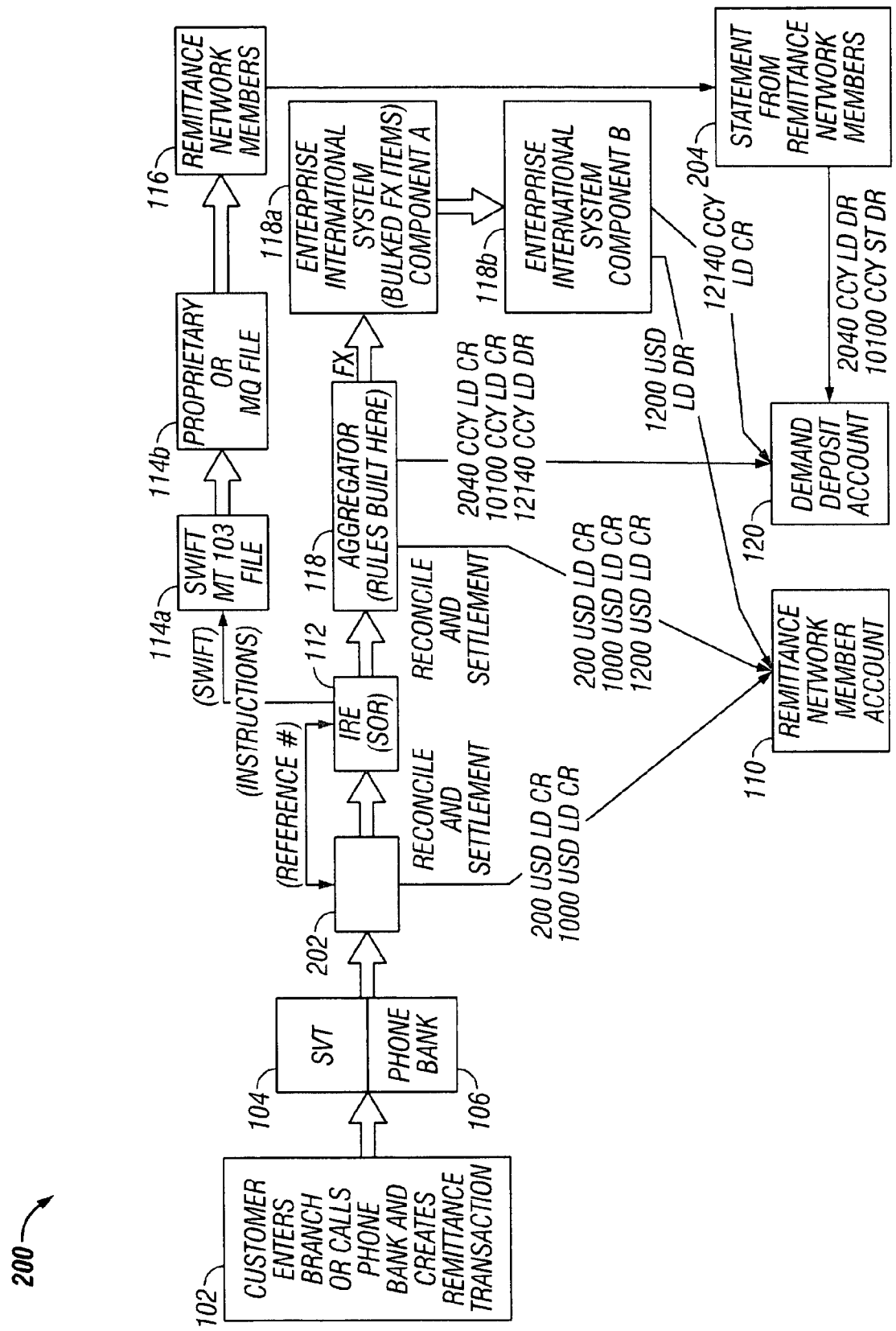
FIG. 2 is a block schematic diagram showing a system according to the invention.
Figure 3A:
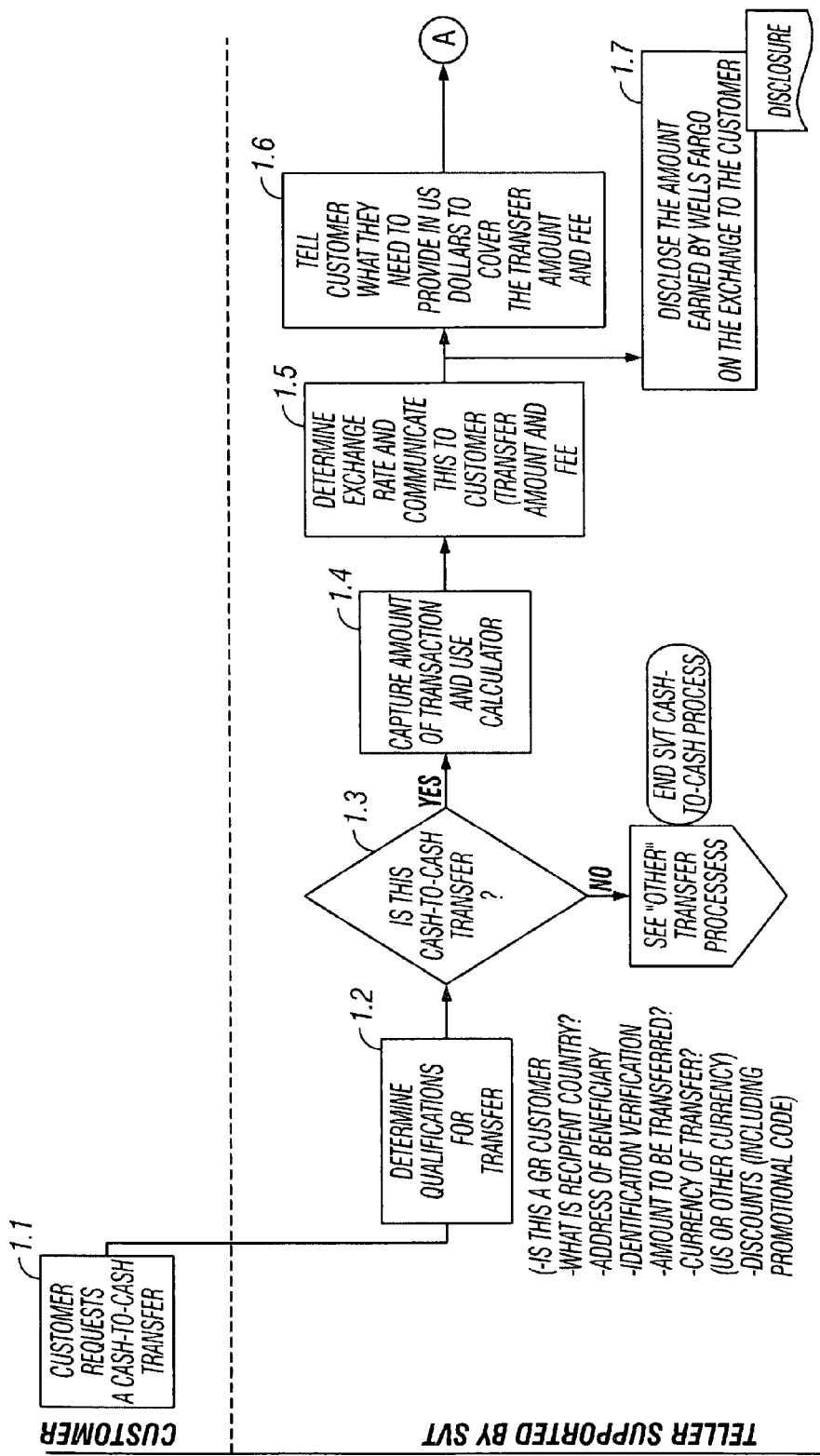
FIGS. 3A-3D show a flow chart showing a cash-to-cash transfer process according to the invention.
Figure 3B:
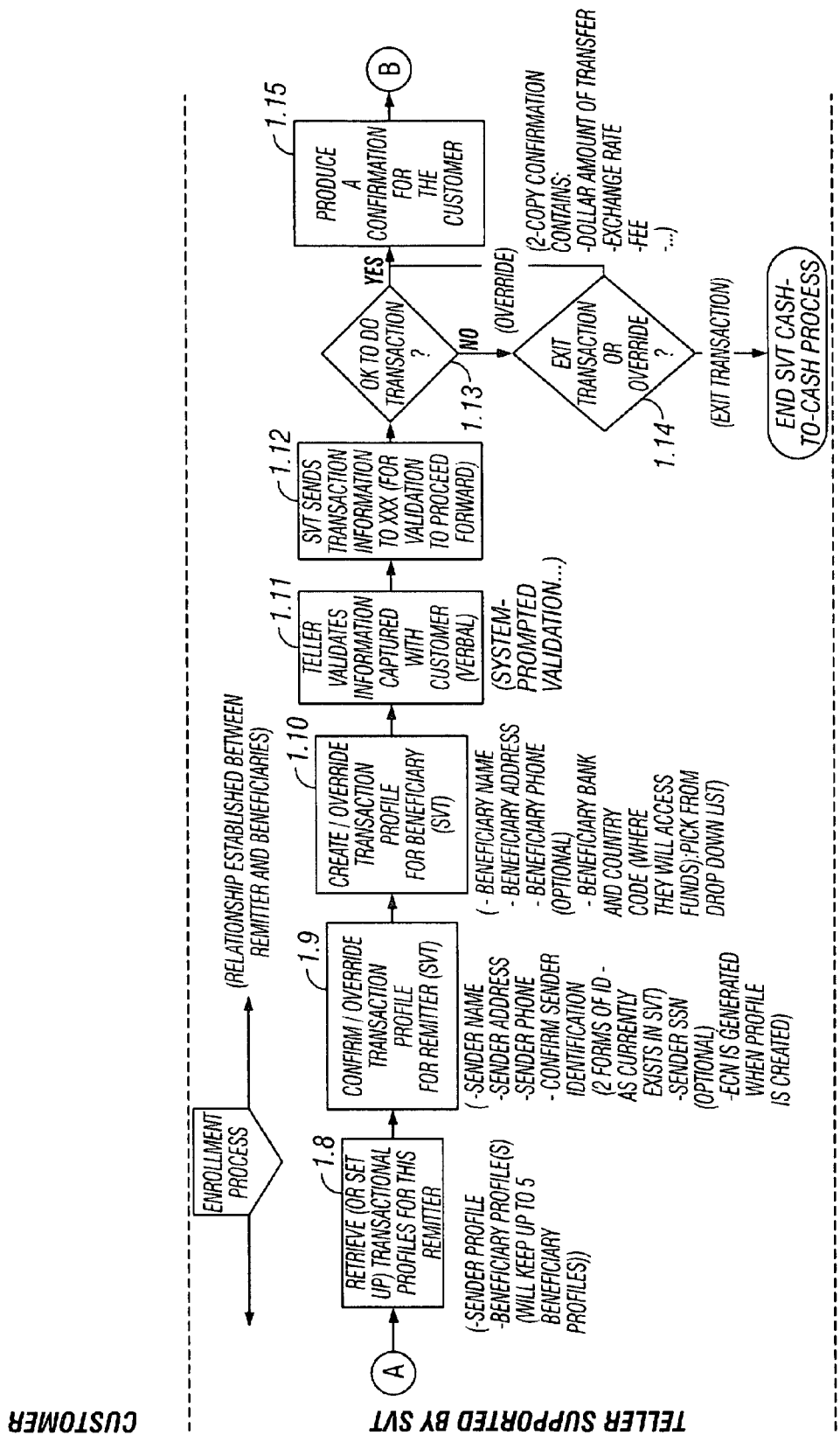
Figure 3C:
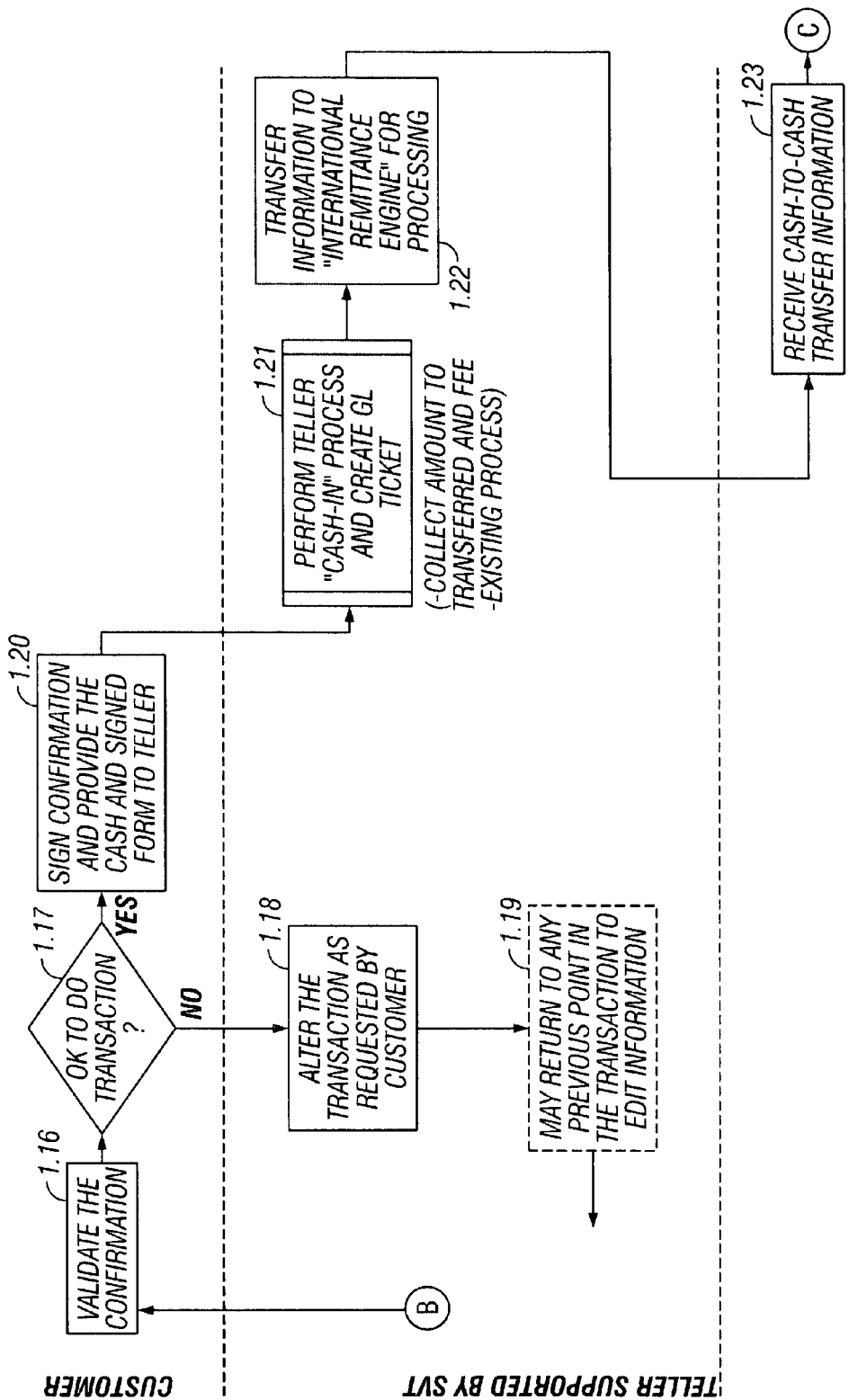
Figure 3D:
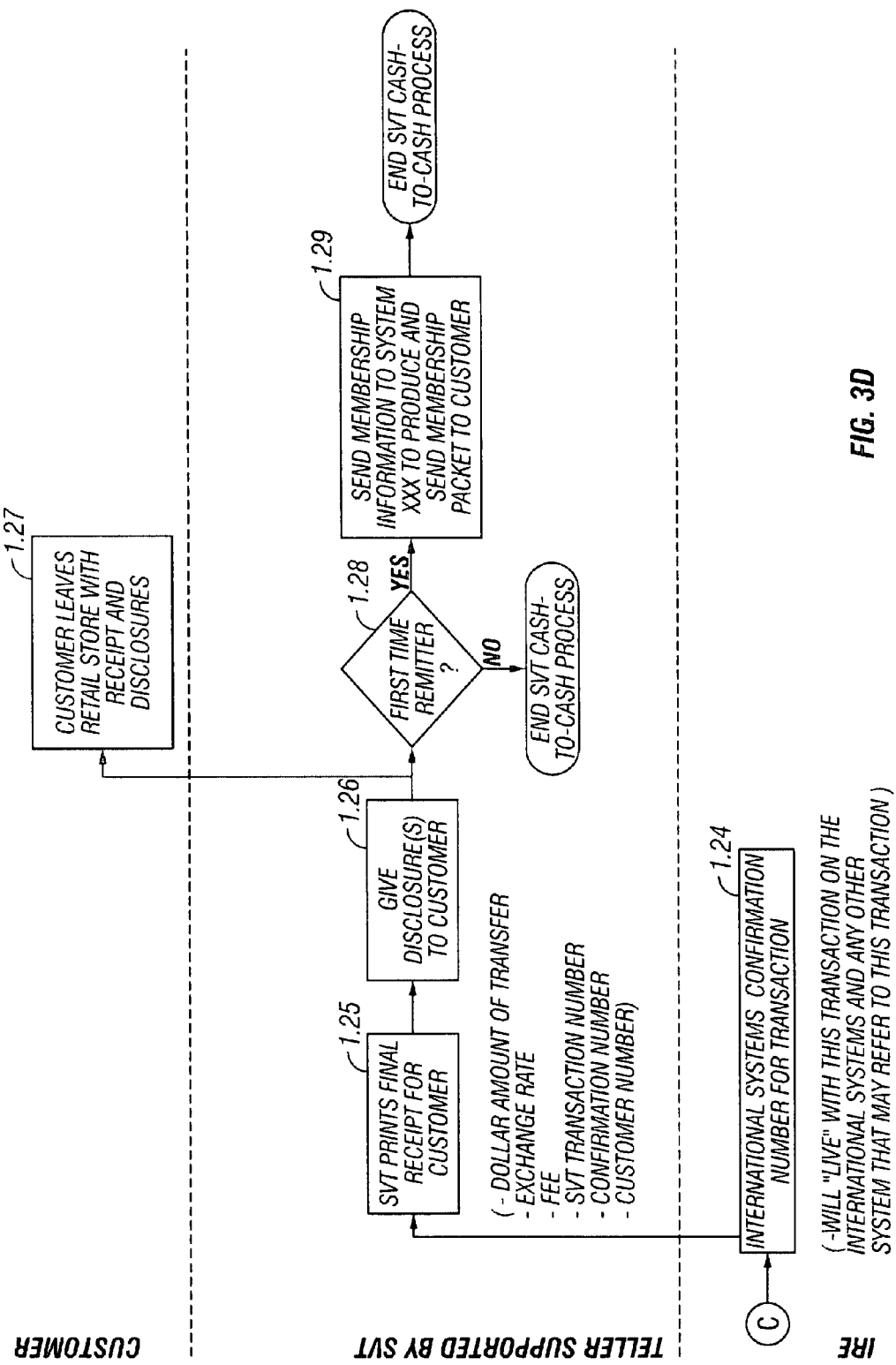
Figure 4A:
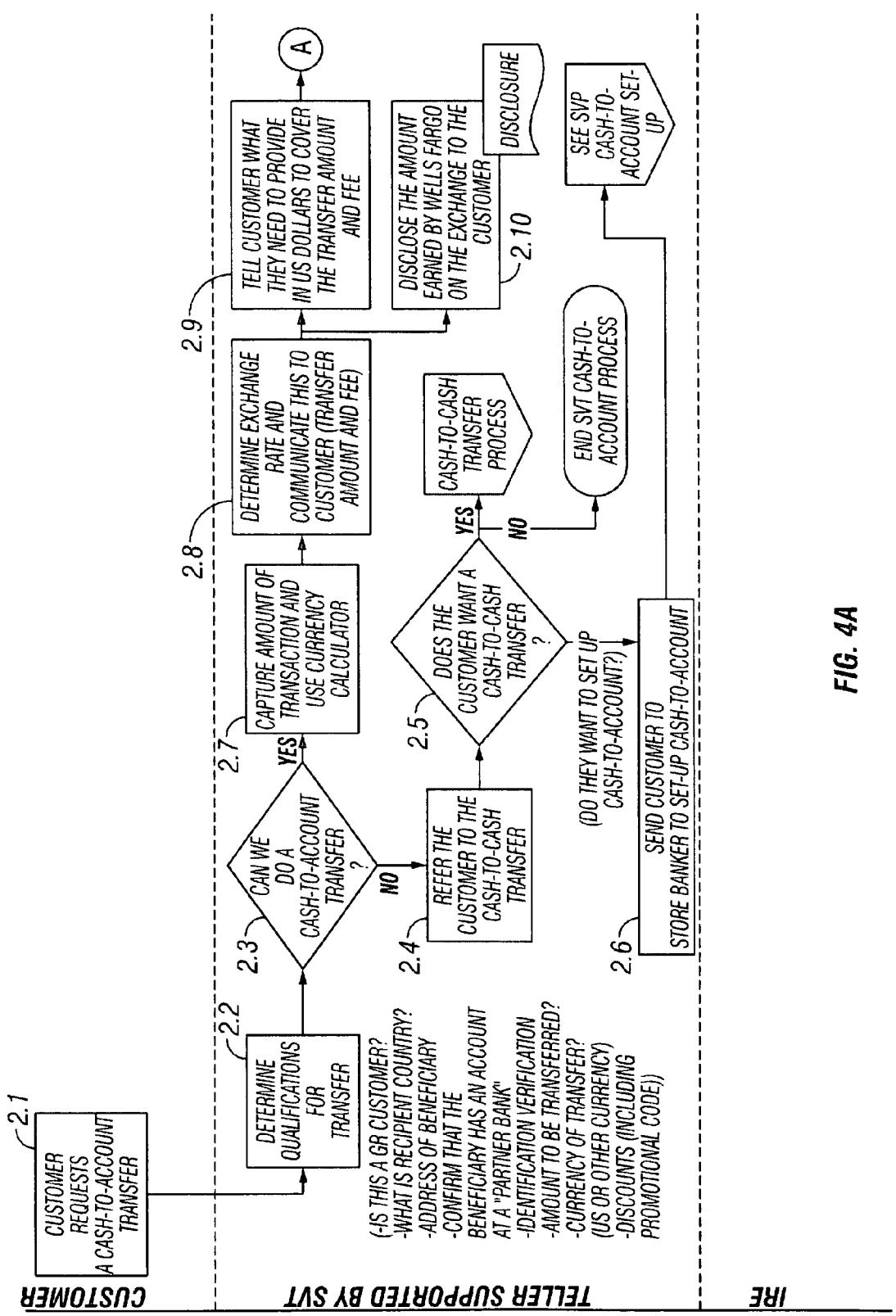
FIGS. 4A-4D show a flow chart showing a cash-to-account transfer process according to the invention.
Figure 4B:
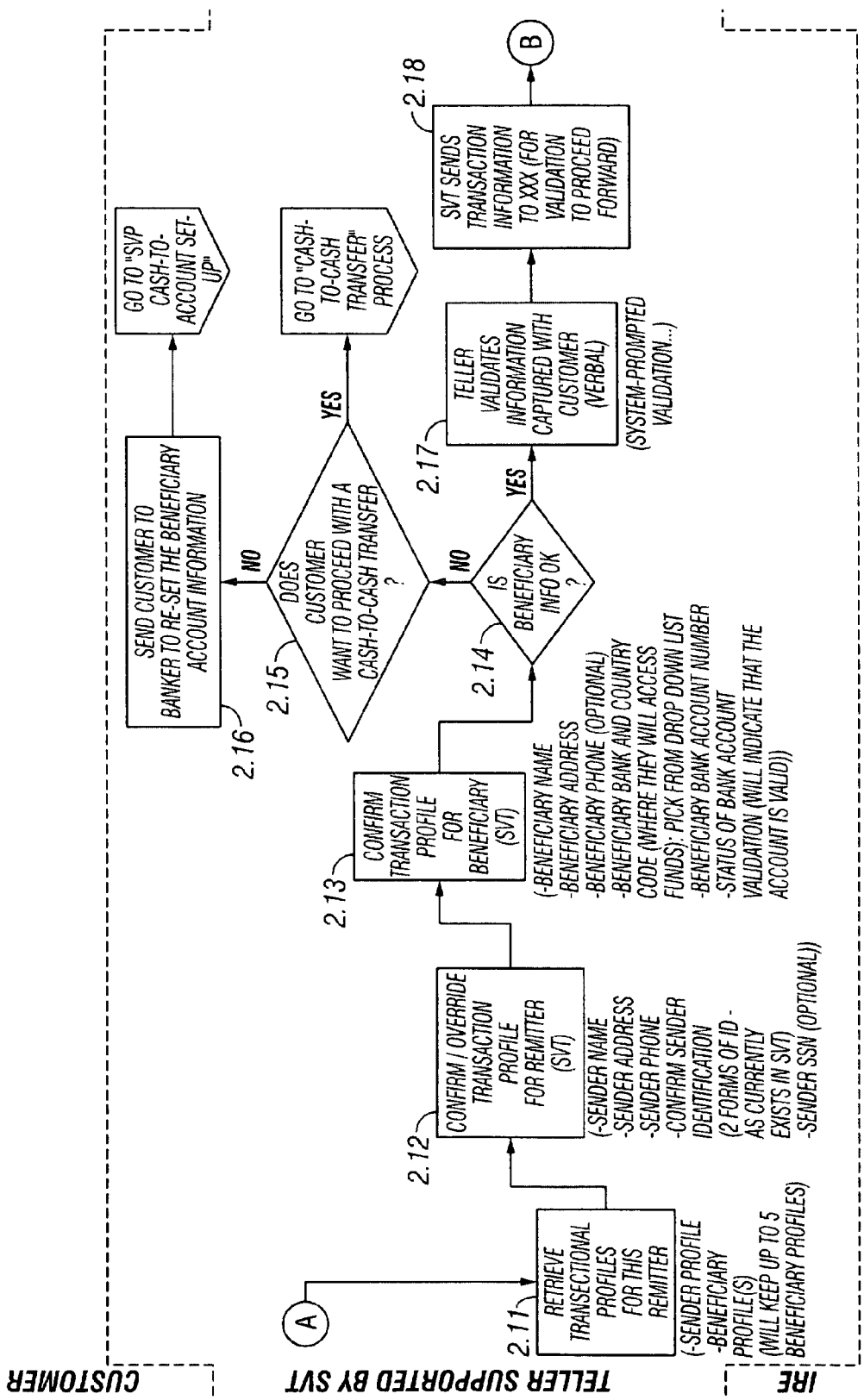
Figure 4C:
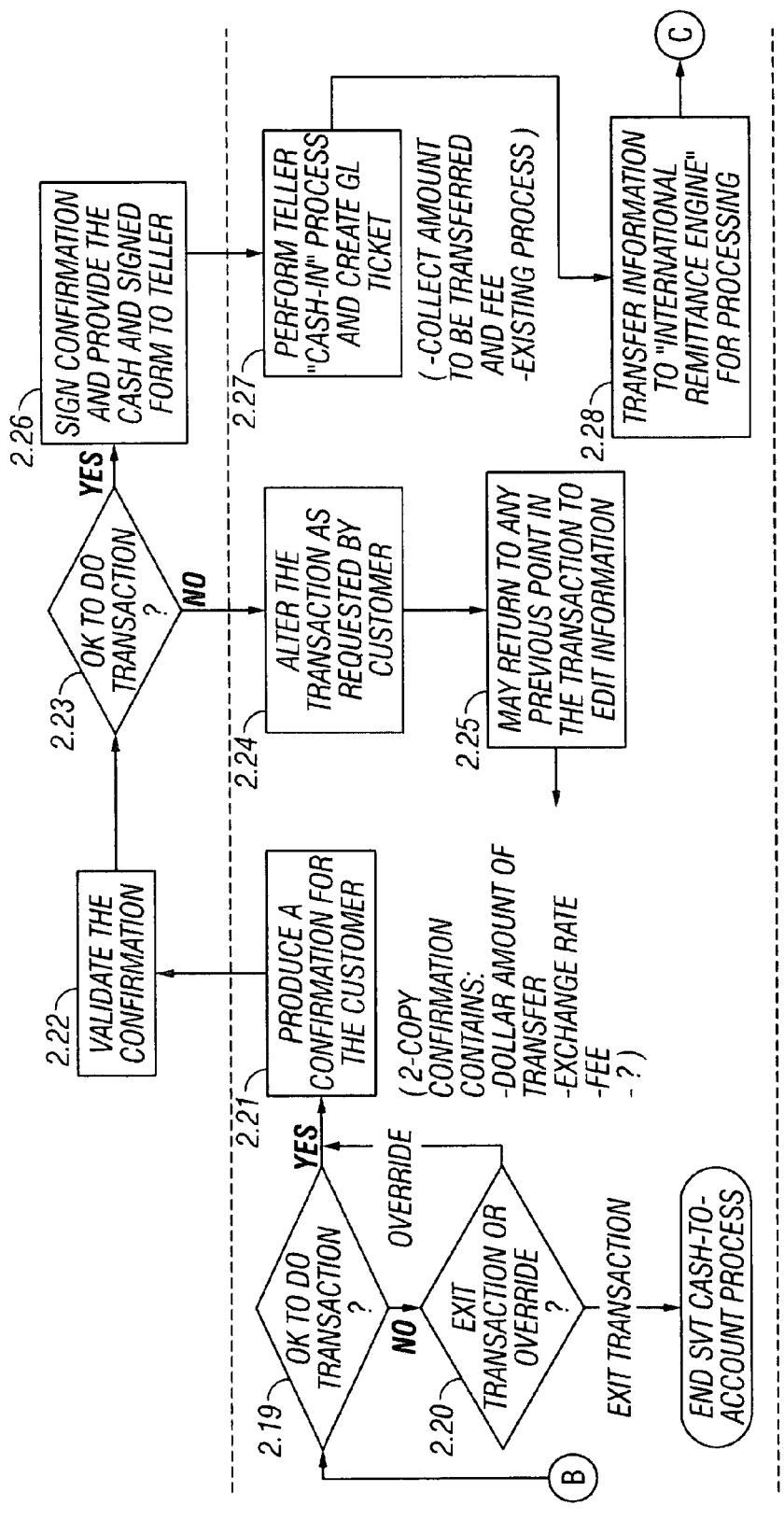
Figure 4D:
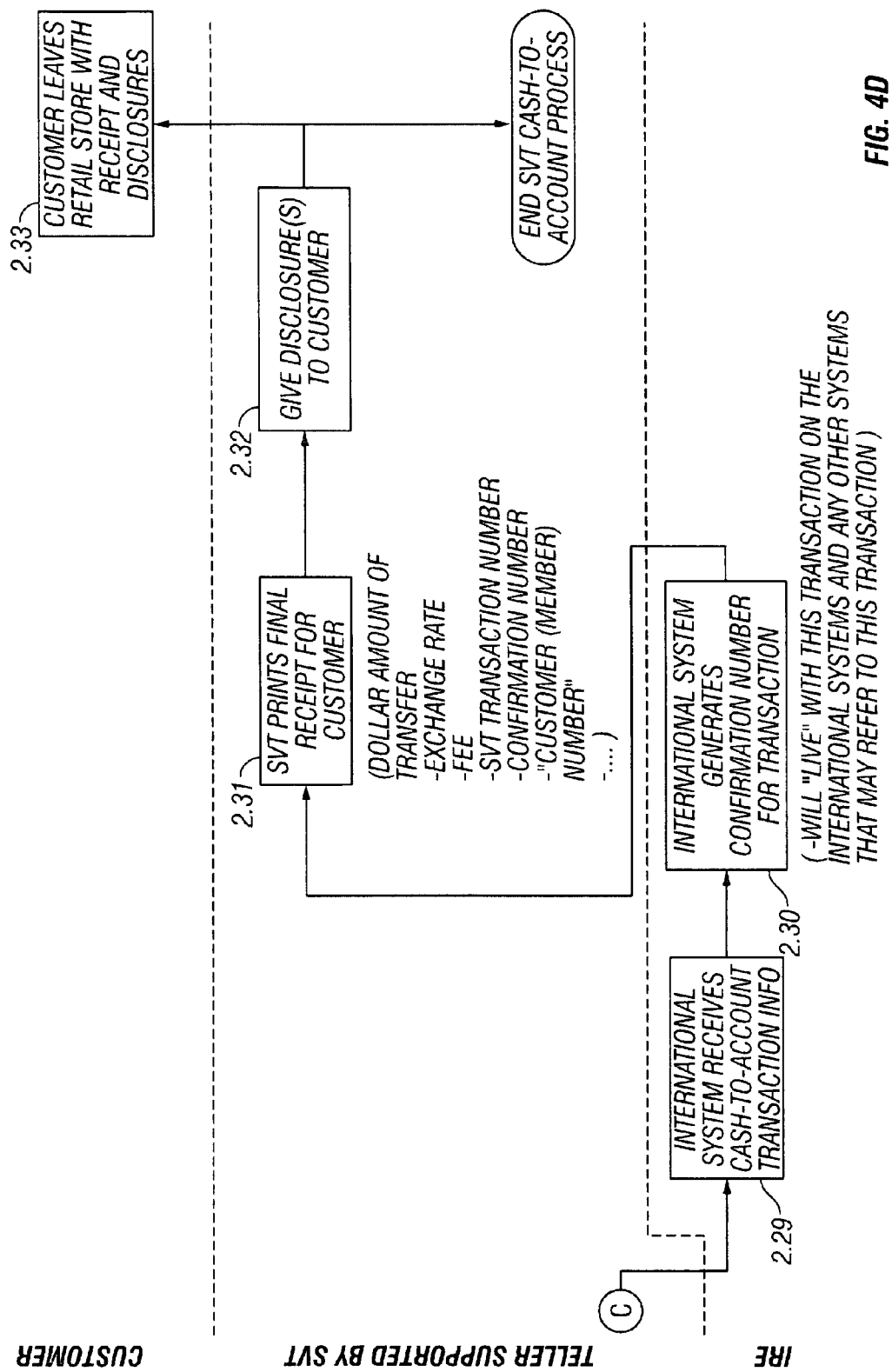
Figure 5A:
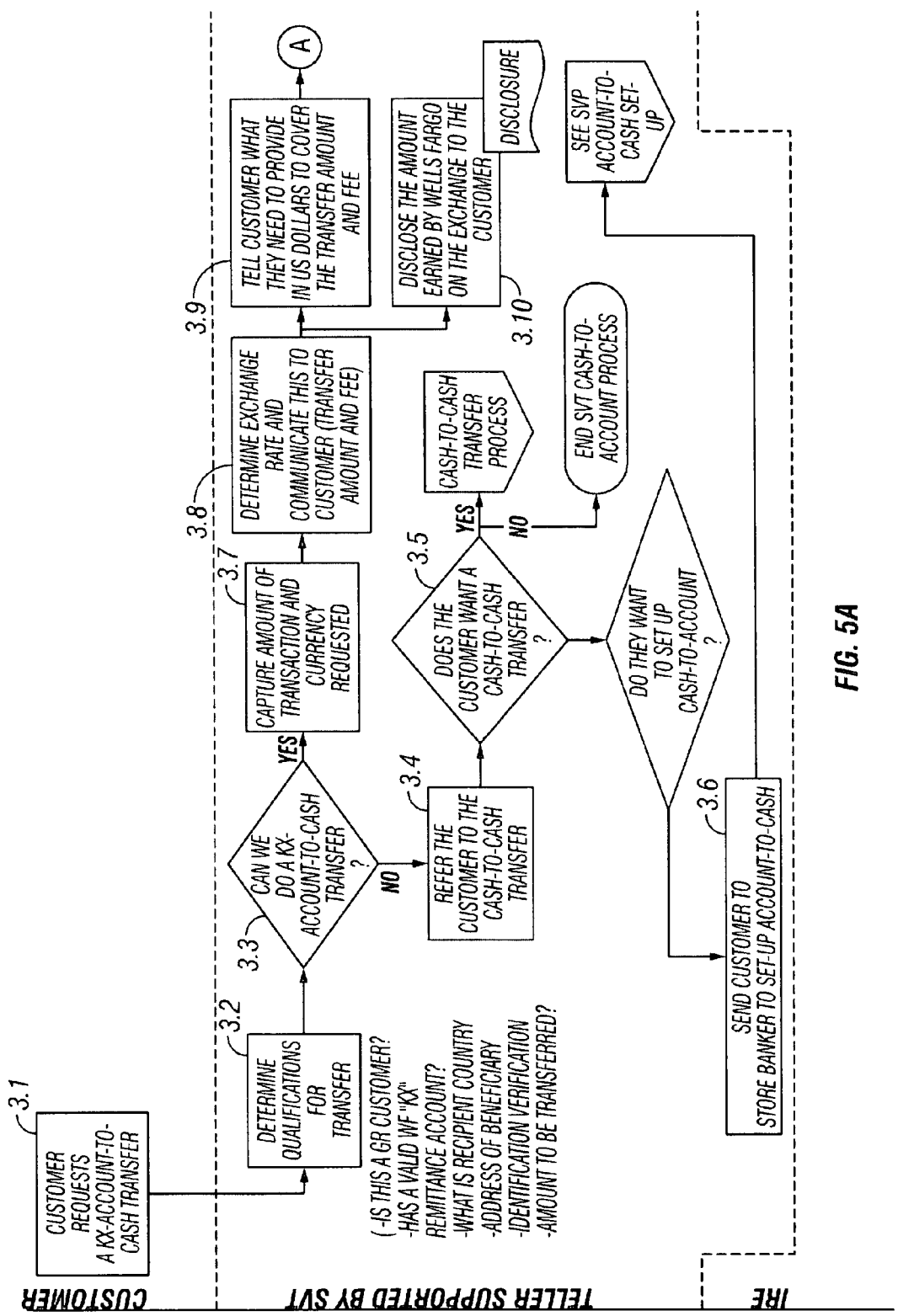
FIGS. 5A-5D show a flow chart showing an account-to-cash transfer process according to the invention.
Figure 5B:
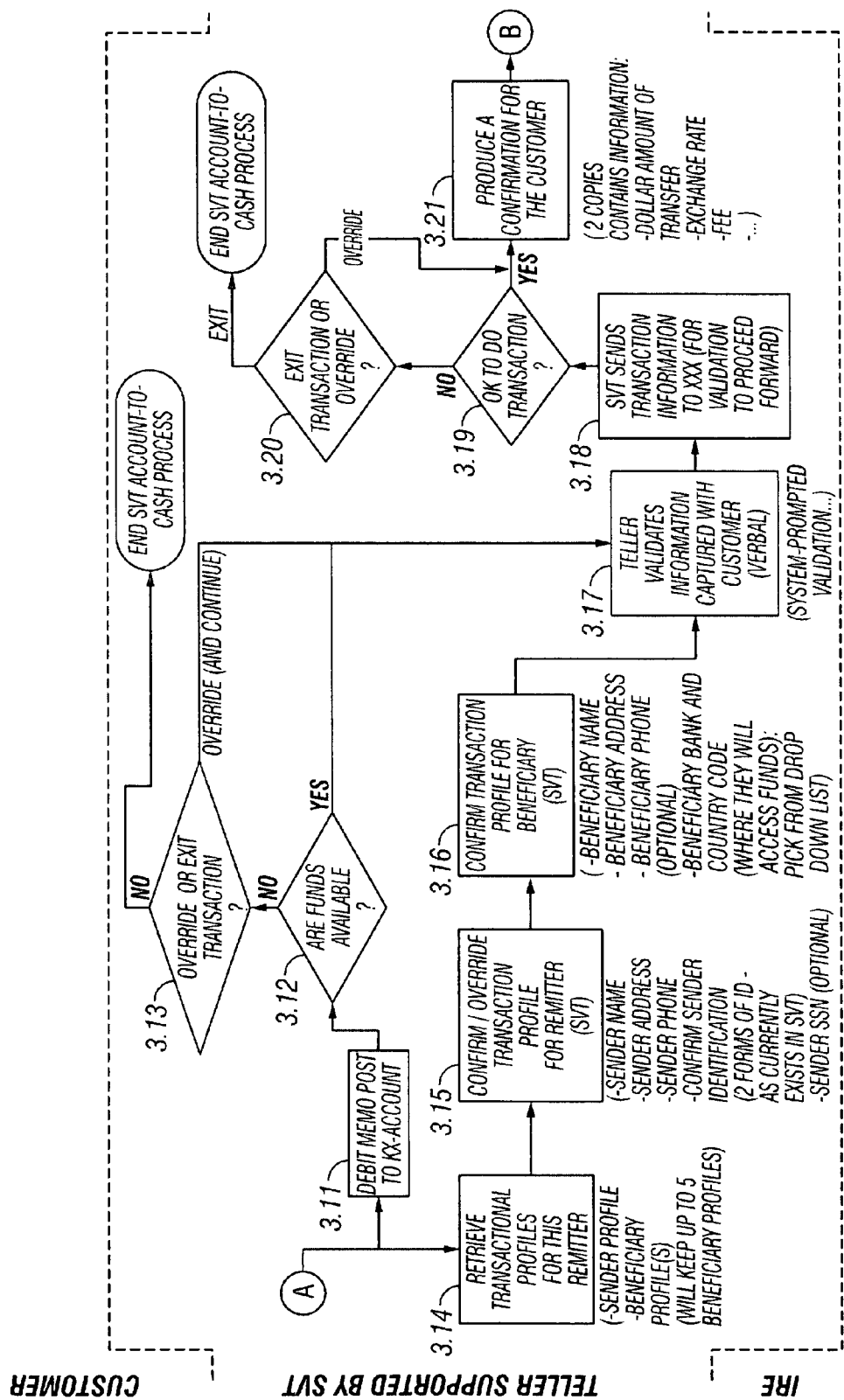
Figure 5C:
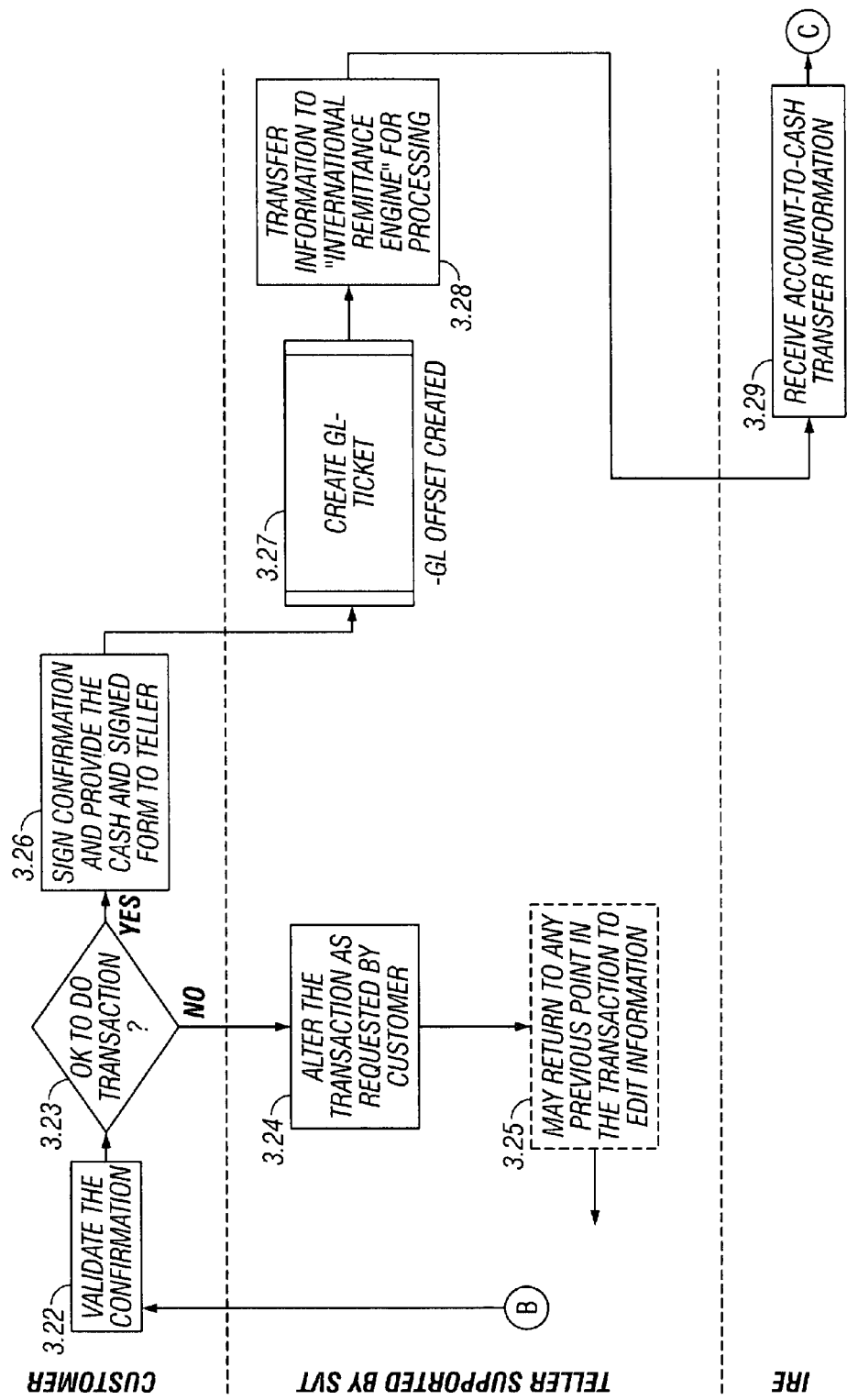
Figure 5D:
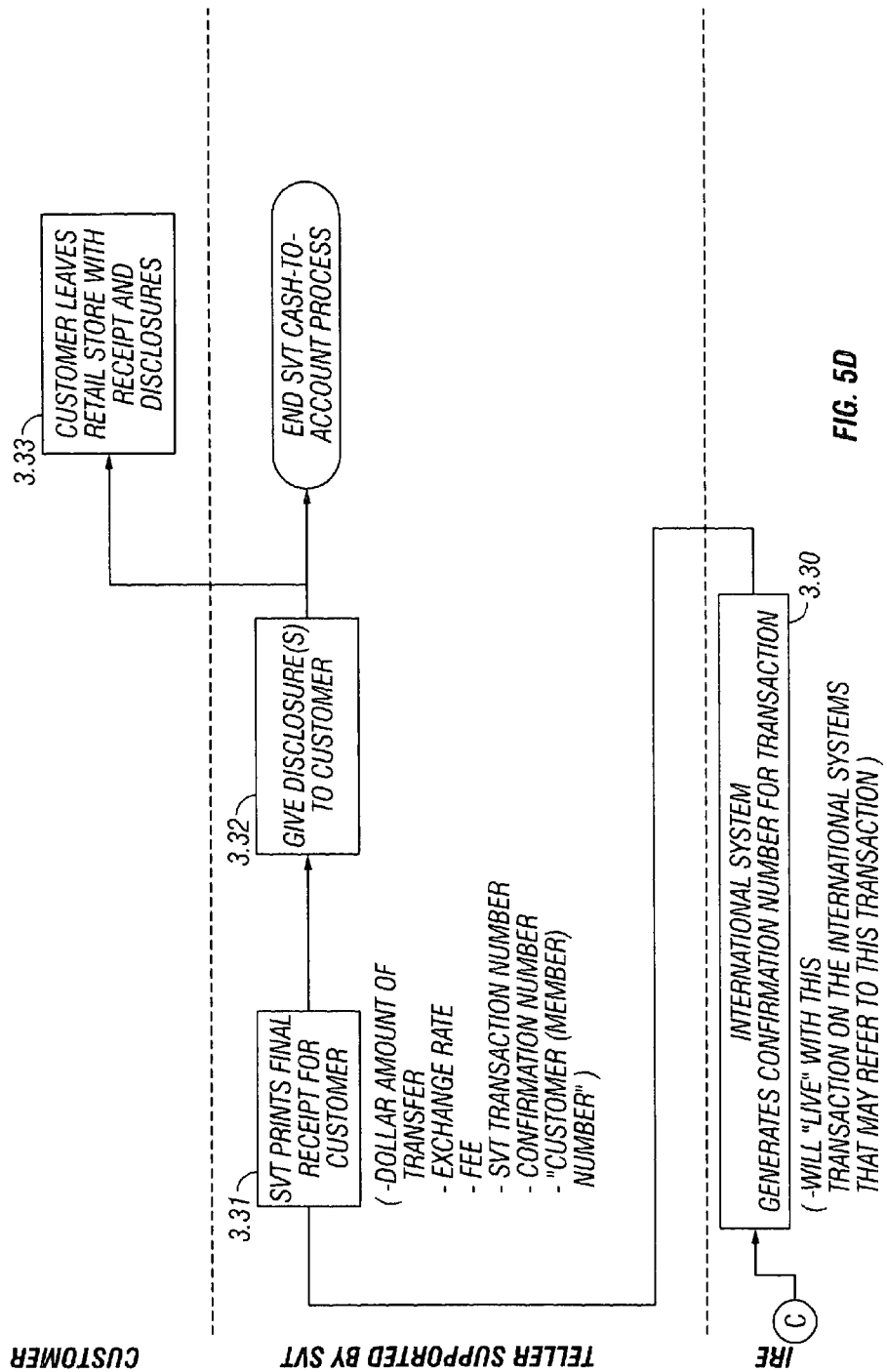

One embodiment of the invention can be described with reference to FIG. 2, a block diagram showing an overview of the system 200. FIG. 2 is similar to FIG. 1, but showing different detail. A customer can enter a branch of an enterprise, such as Wells Fargo, or call up the enterprise's phone bank to creates a foreign exchange remittance transaction 102. If the customer walks into the branch office, then the remittance transaction is made using a Store Vision Teller (SVT) system and method 104. Otherwise, the customer calls into the phone bank 106 to initiate a remittance transaction. The request for the foreign exchange remittance transaction is sent in the form of a message to a financial system component 202. The financial system component 202 sends a reconcile and settlement message including the transactional information to a remittance network member account 110 for verification. Such account resides in the enterprise infrastructure. As well, the enterprise financial system 108 sends the transactional information to an international remittance engine (IRE) 112 that is also part of the enterprise infrastructure. The IRE sends the transactional information and instructions outside of the enterprise infrastructure via a SWIFT file 114a to an MQ or other proprietary messaging file 114b. Such file 114b is authenticated and received by an associated remittance network member system 116. As well, the IRE sends the transactional information to the enterprise's remittance general ledger (GL) system or aggregator system 118. The enterprise remittance GL system or aggregator system 118 processes the transaction informational and sends a different reconcile and settlement message to the enterprise remittance network member account 110. The aggregator system 118 sends the transactional information to the enterprise's internal international systems, shown herein as component A 118a and component B 118b. The international system component B 118b sends another reconcile and settlement message to the remittance network member account 110. It should be appreciated that the transactional information sent to the remittance network member account 110 from each enterprise system, the financial system component 202, the enterprise remittance GL system 118, and the enterprise international system component B, should match. If they match, the enterprise remittance GL system 118 makes funds available on an aggregate level in the actual demand deposit account 120. The remittance network member sends a statement 204 to the demand deposit account.

It should be appreciated that the IRE 112 maintains and provides information related to the countries and banks that are set up for a global remittance platform, such as for example, country, bank, currency supported, and methods available to receive funds. Such information can be used by a calling channel, such as SVT or SVP, described in detail hereinbelow, to ensure that only the information that is supported by a specific bank is made available, such as in a drop down list.

Further, the IRE offers business services: a foreign exchange (FX) calculator and a remittance modeling service that calls the FX calculator. IRE supports remittance messages and message/file exchange between the enterprise and the remittance network member.

One embodiment of the invention provides the following privacy and disclosure features. An enhanced account statement to show current information plus some additional disclosures pertaining to the calculation of the spread for each transaction. A debit from KX account is shown on account statement. In account-to-anything products, disclosures for account-based products are added to a consumer account agreement booklet and the consumer account fee and information schedule. Disclosures can be available in English and Spanish, for example. Annual privacy policy can be distributed in accordance with requirements for all types of accounts. For anything-to-anything at remittance, a disclosure, referred to herein as an information confirmation, is signed by the remitter, for each individual remittance, printed in both English and the customer's preferred language as indicated in an associated system. For cash-to-anything at enrollment, a new service agreement form at enrollment is provided for privacy/terms and conditions, available in English and in the customer's preferred language, as a separate enclosure provided to the remitter at the time of enrollment. In one embodiment of the invention, the form is signed by customer and retention is stored in centralized storage. A privacy policy can be sent annually to any remitter with an active status on his or her record. The invention identifies and provides a file of all active cash based remittance accounts. One embodiment of the invention integrates relevant disclosure reporting capability from a preexisting dynamic disclosure service. In one embodiment of the invention, each global remittance transaction prints the following documents: "Transaction disclosure" for verification and signatures and "Transaction Record" at the conclusion of the transaction.

One embodiment of the invention provides a KX remittance account and associated features and functionality as follows:

An Exemplary Remittance Account

A KX Account is an on demand remittance DDA account with the ability to have one or multiple beneficiaries. Following is a list of features that are by way of example only and are not meant to be limiting.

Features:

Sales Channels SVP, EDGE system, i.e. existing customers, Internet banking, i.e. existing customers.

KX account to have the ability to send money on demand at any time during the day, e.g. up to 8:00 pm PST, to partner bank beneficiary or send regular, recurring scheduled payments, or ad hoc payments.

Funds are hard memo posted to lock in funds for transfer in the future. Remitter cannot withdraw these funds after authorizing a funds transfer.

Set up an on demand remittance DDA Account with the ability to have single or multiple beneficiaries.

Ability to send money real time through message base transfer.

Ability to designate a future date and amount for remittance.

Ability to transfer funds into the KX account.

No ability to write checks on the account.

No accounts or credit cards can be linked to the account to provide or receive overdraft protection.

Ability to place a memo hold on funds for the amount of transaction plus fees. Does not apply if posted real time.

Ability for the existing customer to attach KX account to their existing ATM card.

Account monthly statement to have all the same required fields as KF statement.

All options need to be set up and subject to established aggregate remittance limits.

The requirements for the type of currency a beneficiary can receive and limitations on the transfer amounts are predetermined.

The business group to provide the fee structure including pricing and promotion as provided by the product pricing catalog.

The business to provide appropriate materials for disclosures and Welcome kit.

The remitter is also given the option how he/she wants the beneficiary to receive the funds. The following four options are given. One or more of the following options can be selected:

Account to Account—Ability to send money at any time during the day to partner bank beneficiary account or send regularly scheduled payments to beneficiary account. Multiple beneficiaries can be set up on KX account. Can use sales channels, e.g. SVP, Edge (existing customers) and Internet banking (existing customers) and a universal workstation (UW) for cross border servicing.

KX Account to Cash—Ability to send money at any time during the day to partner bank for cash pick up. Multiple beneficiaries can be set up on KX account to receive cash. Can use sales channels such as SVP, Edge (Existing customers) and Internet Banking (Existing customers), and UW.

KX Account to Instrument—Ability to send money at any time during the day to partner bank for payment via negotiable instrument, such as, demand draft delivery. Multiple beneficiaries can be set up on KX account to receive negotiable instruments. Can use sales channels such as, Edge (existing customers) Internet Banking (Existing customers) and UW.

KX Account to Card—Ability to send money at any time during the day to the partner bank to be given to the beneficiary in the form of some prepaid, i.e. stored value, card issued by the partner bank. It should be appreciated that this does not include ATM. Multiple beneficiaries can be set up on KX account to receive cards. Use sales channels such as SVP, Edge (existing customers) Internet Banking (Existing customers) and UW.

Exemplary Messages

One embodiment of the invention provides for one or more ways to communicate with a partner bank, also referred to herein as a remittance network member. It should be appreciated that a request can be delivered to the partner bank via enterprise internal and proprietary messaging, SFT, Swift or phone call. A primary and secondary delivery method can be defined for each partner bank. This message can be delivered synchronously (sync) or asynchronously (async) depending on the delivery method:

Proprietary—Sync;

SFT—Async; and

Swift—Async.

In one embodiment of the invention, such message is able to support single account verification or a list of accounts.

Seven Exemplary Processes

One embodiment of the invention can be described with respect to seven processes, by is by no means limited to seven, referred to herein as: cash-to-cash transfer, remittance account-to-cash transfer, cash-to-account transfer, account-to-cash set-up process, cash-to-account set-up process, phone bank remittance account set-up, and phone bank remittance account transfer. It should be appreciated that a final process, referred to herein as clear-to-pay by an international remittance engine can be considered an eighth process. The details of each process according to an embodiment of the invention are described hereinbelow.

It should be appreciated that the terms, system and process, are used hereinbelow interchangeably for ease of understanding the inventive concept within context.

An Exemplary Store Vision Teller (SVT) Cash-to-Cash Transfer Process

One embodiment of the invention is described with respect to the following scenario and can described with reference to FIG. 3. The following scenario is meant by way of example only for ease of understanding and is not meant to be limiting.

Triggering Event(s)

In one embodiment of the invention, a person walks into retail store that uses a Store Vision Teller (SVT) and requests a cash-to-cash transfer. It should be appreciated that the customer is not doing a wire transfer.

Process Flow

A customer requests a cash-to-cash transfer 1.1.

The teller supported by the SVT, or simply, SVT determines qualifications for transfer 1.2. Example data are as follows:
 Is this a global remittance customer?
 What is recipient country?
 Address of beneficiary.
 Identification verification.
 Amount to be transferred?
 Currency of transfer.
 Any applicable discounts including promotional code.

SVT determines if this a cash-to-cash transfer 1.3.

If not, then the customer is referred to other transfer processes and the SVT cash-to-cash process ends.

If yes, then SVT captures the amount of transaction and use a currency calculator 1.4.

SVT determines the exchange rate and communicates this to customer, as well as the transfer amount and fee 1.5.

SVT tells the customer what they need to provide in US dollars to cover the transfer amount and fee 1.6

Is addition, SVT discloses the amount earned by the enterprise on the exchange to the customer 1.7

It should be appreciated that according to one embodiment of the invention, the following steps (1.8 through 1.10) are considered as part of an enrollment process, and wherein a relationship is established between remitter and beneficiaries as follows:

SVT retrieves or sets up transactional profiles for this remitter 1.8. Example information are as follows:
 Sender profile; and
 Beneficiary profile(s).

SVT confirms or overrides the transaction profile for remitter 1.9. Example related information are as follows:
 Sender name;
 Sender address;
 Sender phone;
 Confirm sender identification, e.g. using two forms of identification previously stored in SVT;
 Sender social security number (SSN) (optional); and
 ECN is generated when the profile is created.

SVT creates or overrides the transaction profile for beneficiary 1.10. Example related information are as follows:
 Beneficiary name;
 Beneficiary address;
 Beneficiary phone (optional);
 Beneficiary bank and country code, i.e. where the beneficiary will access the funds. Such bank and code can be available from a drop down list.

The teller validates information captured with customer, e.g. verbal 1.11. In one embodiment of the invention, the SVT system prompts the teller to capture such information from the customer.

SVT sends the transaction information to one or more subsystems for validation to precede forward 1.12.

SVT determines if it is OK to follow through with transaction 1.13. If not, then SVT determines whether to exit transaction or override 1.14. If the decision is to exit the transaction, then the SVT cash-to-cash process ends.

If the decision is to override, then control goes to SVT producing a confirmation number for the customer 1.15. Example information are as follows:
 Dollar amount of the transfer;
 Exchange rate; and
 Fee.

If SVT determines if it is OK to follow through with transaction 1.13, then control goes to SVT producing a confirmation number for the customer 1.15 as hereinabove.

The customer validates the confirmation 1.16.

The customer determines if it is OK to do transaction 1.17. If not, then the customer uses SVT to alter the transaction customer 1.18. Control may return to any previous point in the transaction to edit information 1.19. It should be appreciated that in one embodiment of the invention, SVT allows transaction editing. In another embodiment of the invention, SVT exits the transaction process and starts a new transaction.

If the customer determines if it is OK to do transaction 1.17, then the customer signs a confirmation and provides the cash and signed form to teller 1.20.

The teller, via SVT performs a teller "cash-in" process and creates a general ledger (GL) ticket 1.21. The teller collects the amount to be transferred and the fee.

SVT transfers the information to an international remittance engine (IRE) for processing 1.22.

The IRE receives the cash-to-cash transfer information 1.23.

The International system creates a confirmation number for transaction 1.24. The international system stores the transactional information for future processing as well as any other system stores the transactional information.

The SVT prints a final receipt for the customer 1.25. By way of example, the final receipt may show the following, but is by no means limited to:
 Dollar amount of the transfer;
 Exchange rate;
 Fee;
 SVT transaction number;
 Confirmation number; and
 Customer number.

The disclosure(s), including the receipt, is provided to the customer 1.26. This is an opportunity for the enterprise or partner to provide other types of information for the customer. In one embodiment of the invention, the enterprise complies with regulations and provides regulatory disclosure, such as for example, the amount of profit to the enterprise for this particular remittance transaction.

In possession of the receipt and other disclosures, the customer is able to leave the vicinity of the SVT, such as a retail store 1.27.

According to one embodiment of the invention, the system inquires if the person performing the remittance is a first-time remitter 1.28. If not, the SVT cash-to-cash process ends. If yes, the system sends a trigger, by way of example, actual membership information, to a second system or process that then produces and sends a membership packet to the customer 1.29. In one embodiment of the invention, the customer is sent a card. The SVT cash-to-cash process ends.

Outputs

Following are some example outputs according to one or more embodiments of the invention. Such list is by no means exhaustive:
 An enterprise customer number is assigned and links to the beneficiary from the remitter are created.
 A sales tracking system has set-up information.
 Compliance information has been recorded.

The cash-to-cash global remittance transaction is stored in SVT.

A transaction profile(s) is stored in the SVT.

Data is transferred to the International Remittance Engine for the creation of a confirmation number.

The transaction data are stored in the International Remittance Engine for the purposes of further processing.

The transaction data are sent to the appropriate systems, for example, to create the membership packet for the customer.

An Exemplary Store Vision Teller (SVT) Cash-to-Account Transfer Process

One embodiment of the invention is described with respect to the following scenario and can be described with reference to FIG. 4. The following scenario is meant by way of example only for ease of understanding and is not meant to be limiting.

Triggering Event(s)

An example triggering event is a person walking into a retail store which uses an SVT system and process and requests a cash-to-account transfer.

Or, another example of a triggering event is a customer has previously been set up on cash-to-account processing.

Process Flow

One embodiment of the invention can be described as follows. The described process is meant by way of example and is not meant to be exhaustive.

A customer requests a cash-to-account transfer 2.1.

SVT determines the qualifications for the transfer 2.2. Example of information acquired or determined by SVT are as follows:

Is this a Global Remittance customer?
What is the recipient country?
What is the address of the beneficiary?
Confirm that the beneficiary has an account at a partner bank.
Perform identification verification.
What is the amount to be transferred?
What is the currency of the transfer?
Should any discounts be applied, such as from a promotional code?

SVT determines if a cash-to-account transfer is possible 2.3. If not, SVT refers the customer to the cash-to-cash transfer 2.4. Then, SVT determines if the customer wants the cash-to-cash transfer 2.5. If yes, the customer is referred to the cash-to-cash transfer process. Otherwise, SVT ends the cash-to-account process.

If the customer wants a cash-to-cash transfer, then SVT asks the customer if the customer wants to get set up for cash-to-account. SVT sends the customer to a store banker to get set up for cash-to-account 2.6 the details of which are described hereinbelow.

If SVT determines a cash-to-account transfer is possible 2.3, SVT then captures the amount of transaction and uses a currency calculator 2.7. SVT determines an exchange rate and communicates this to the customer, specifically, as the transfer amount and fee 2.8. It should be appreciated that how SVT obtains and assigns the foreign exchange (FX) rate can be by any means. SVT discloses the amount earned by the enterprise, such as Wells Fargo for example, on the exchange, such as a receipt or disclosure, to the customer 2.10. In one embodiment of the invention, the enterprise complies with regulations and provides regulatory disclosure, such as for example, the amount of profit to the enterprise for this particular remittance transaction. Additionally, SVT tells the customer what they need to provide in US dollars to cover the transfer amount and the fee 2.9. That is, SVT retrieves transactional profiles for the remitter 2.11. Examples of such information include:

Sender profile; and
Beneficiary profile(s).

SVT confirms/overrides information in the transaction profile for the remitter 2.12. Examples of such information include:

Sender name;
Sender address;
Sender phone;
Confirms sender identification, e.g. SVT stores two forms of identification); and
Sender SSN (optional).

SVT confirms/overrides information in the transaction profile for the beneficiary 2.13. Examples of such information include:

Beneficiary name;
Beneficiary address;
Beneficiary phone (optional);
Beneficiary bank and country code, i.e. where the beneficiary will access funds, which can be picked from a drop down list;
Beneficiary bank account number; and
Status of bank account validation, i.e. indicates that the account is valid.

Teller verifies whether the KX account is active with a verified beneficiary on record 2.14. If not, Teller determines if the customer wants to proceed with a cash-to-cash transfer. If yes, control is transferred to the cash-to-cash transfer process. If not, SVT sends the customer to the banker to re-set beneficiary account information 2.16 and the customer is directed to the SVP Cash-to-account set up process described hereinbelow.

If the Teller verifies whether the KX account is active with a verified beneficiary on record 2.14, then the teller validates the information captured with the customer, for example, verbally 2.17. In one embodiment of the invention, the system prompts the teller to validate the information.

SVT sends transaction information to various one or more sub-systems for validation to proceed 2.18.

SVT determines if it is okay to follow through with the transaction 2.19. If not okay to proceed, SVT determines whether to exit the transaction or override the decision 2.20. If the decision is to exit, then SVT ends the cash-to-account process. If the decision is overridden, then SVT proceeds to produce a confirmation for the customer 2.21. In one embodiment of the invention, two copies of the confirmation acknowledgement contains:

Dollar amount of transfer;
Exchange rate; and
Fee.

As well, if SVT determines to proceed with the transaction, SVT proceeds to produce a confirmation for the customer 2.21.

The customer validates the confirmation 2.22.

The customer determines whether or not to follow through with the transaction 2.23. If the customer does not follow through with the transaction, the customer can alter the transaction by way of the SVT 2.24. As well, the customer via SVT can return to any previous point in the transaction to edit information 2.25. In one embodiment of the invention, SVT cancels the current transaction and generates a new transaction for the new and/or changed information.

If the customer decides to proceed with the transaction, the customer signs the confirmation and provides the cash and signed form to a teller 2.26. SVT then performs a teller cash-in process and creates a GL ticket 2.27. By way of example, the following information is provided to the SVT:
- Collected amount to be transferred and fee;
- Existing process; and
- Cash-in process can be electronic.

SVT transfers information to the IRE for processing 2.28.

IRE receives cash-to-account transaction information 2.29 and generates a confirmation number for the transaction 2.30.

SVT may store such transaction information and any other systems as well may store such transaction information for future reference 2.30.

SVT prints a final receipt for the customer 2.31. Example information provided on the receipt include, but are not limited to:
- Dollar amount of transfer;
- Exchange rate;
- Fee;
- SVT transaction number;
- Confirmation number; and
- Customer or member number.

SVT provides other disclosure, if available, to the customer 2.32.

The customer, in possession of receipt and any other disclosure, is in a position to leave the retail store 2.33.

The SVT cash-to-account process ends.

Outputs

Following are some example outputs according to one or more embodiments of the invention. Such list is by no means exhaustive:
- Compliance information has been records;
- Cash-to-account Global Remittance Transaction in SVT;
- Transaction Profile(s) in SVT;
- Data transferred to IRE for creation of confirmation number; and
- Transaction in IRE for further processing.

An Exemplary Store Vision Teller (SVT) Remittance-Account-to-Cash Transfer Process One embodiment of the invention is described with respect to the following scenario and can be described with reference to FIG. 5. The following scenario is meant by way of example only for ease of understanding and is not meant to be limiting.

Triggering Event(s)

According to one embodiment of the invention, an account holder, such as one at Wells Fargo, for example, uses the remittance system such as in a retail store, for example, and requests an account-to-cash transfer.

In one embodiment of the invention, an enterprise customer, such as a Wells Fargo customer, has previously been set up with a remittance account, an on-demand remittance DDA account with ability to have one or multiple beneficiaries, referred to herein as a KX account.

Process Flow

A customer requests a KX-account-to-cash transfer 3.1 by way of the SVT.

The SVT system and process determines qualifications for such transfer 3.2. For example, the system may perform the actions as follows or prompt as follows to gather more information:
- Is the customer is a global remittance customer?
- Does the customer have a valid enterprise KX remittance account?
- What is the recipient country?
- What is the address of the beneficiary?
- Identification verification.
- What is the amount to be transferred?

The system determines if a KX-account-to-cash transfer can be performed 3.3.

If no, then the system refers the customer to the cash-to-cash transfer process 3.4. The system determines if the customer want a cash-to-cash transfer 3.4, as well as if the customer wants to set up an account for cash-to-account transfer 3.5. If the customer wants to set up an account for cash-to-account transfer, then the customer is sent to a store banker to set up an account-to-cash account 3.6. The customer is referred to the SVP Account-to-cash set up process described hereinbelow.

If yes, the customer wants a cash-to-cash transfer, then the customer is directed to the cash-to-cash transfer process described hereinabove. If not, then the SVT account-to-cash process ends.

If yes, the customer wants a KX-account-to-cash transfer as in 3.3, then the system captures the amount of the transaction and the type of currency requests 3.7.

The exchange rate is determined and communicated to the customer. Other information, such as the transfer amount and the fee can also be communicated to the customer 3.8.

The system informs the customer the amount of source dollars, for example, US dollars, to cover the transfer amount and fee 3.9. The amount earned by the enterprise on such exchange is disclosed to the customer 3.10.

SVT posts a debit memo to the KX-account 3.11. SVT determines if sufficient funds are available 3.12. If not, SVT determines whether to override and continue the transaction or to exit the transaction 3.13. If the decision is exit the transaction, then the SVT account-to-cash process ends 3.131. If the decision is to override and continue the transaction, the control of the SVT system and process goes to the step where the teller validates the information captured with the actual customer, verbally, for example 3.17. If it is determined that enough funds are available 3.12, then control also goes to the step where the teller validates the information captured with the actual customer, verbally, for example 3.17.

In addition to the logical flow described hereinabove starting with posting a debit memo, SVT also retrieves transactional profiles for the remitter 3.14. Following are examples of the type of information gathered:
- Sender profile; and
- Beneficiary profile(s), for example, up to five beneficiaries.

SVT confirms or overrides the transaction profile for the remitter 3.15. By way of example, elements of the transactional profile include:
- Sender name;
- Sender address;
- Sender phone;
- Sender identification, for example, two forms of identification; and
- Sender Social Security Number (SSN) (optional).

Then, SVT confirms/overrides the transactional profile for the beneficiary 3.16. By way of example, elements of such transactional profile include:
- Beneficiary name;
- Beneficiary address;
- Beneficiary phone (optional); and
- Beneficiary bank and country code, i.e. where they access the funds, for example, they can pick from a drop down list.

The teller validates the information captured at this point with the actual customer, for example, verbally 3.17. In one embodiment of the invention, the system prompts for such validation.

SVT then sends the transaction information to one or more systems for validation to proceed forward 3.18. If it is not okay to proceed with the transaction 3.19, then SVT determines whether to exit the transaction or to override and proceed 3.20. If the determination is to exit, then the SVT account-to-cash process ends. If the determination is to override, then control goes to the step of producing a confirmation for the customer 3.21. Example information produced for the confirmation is as follows:

Dollar amount of the transfer;
Exchange rate; and
Fee.

The confirmation information is validated 3.22.

SVT determines whether or not to proceed with or perform the transaction 3.23. If not, the customer can alter the transaction as per customer request 3.24, and the customer can return to any previous point in the transaction to edit the information 3.25. It should be appreciated that in another embodiment of the invention, SVT exits the present transaction and begins a new transaction.

If yes, it is okay to proceed with the transaction, the customer signs the confirmation and provides the signed form to the teller 3.26.

SVT creates a GL-ticket 3.27. It should be appreciated that a GL-offset is created.

The information gathered is transferred to an international remittance engine (IRE) for processing 3.28. Such engine can be third party.

The IRE receives the account-to-cash transfer information 3.29. An international system generates a confirmation number for the transaction 3.30. The international system stores such transaction information on its one or more sub-systems. Any other sub-system may store such transaction information if desired.

SVT prints a final receipt for the customer 3.31. By way of example, the receipt contains certain types of information as follows:

Dollar amount of transfer;
Exchange rate;
Fee;
SVT transaction number;
Confirmation number; and
Customer or member number.

SVT gives such disclosure, i.e. the receipt, to the customer 3.32. In one embodiment of the invention, the enterprise complies with regulations and provides regulatory disclosure, such as for example, the amount of profit to the enterprise for this particular remittance transaction. It should be appreciated that the information disclosed for each transaction can be predetermined according to particular embodiments of the invention and the specific information described hereinabove is not meant to be exclusive.

The customer, having received the receipt and other disclosures, is able to leave the SVT, such as a retail store, if the SVT is in such store 3.33.

The SVT cash-to-account process ends.

Outputs

Following are some example outputs according to one or more embodiments of the invention. Such list is by no means exhaustive:

Compliance information has been recorded.
Control can go to SVT's Account-to-Cash Global Remittance Transaction process.
Transaction profile(s) in SVT.
Data transferred to IRE for creation of confirmation number.
Transaction is sent to IRE for further processing.

Figure 6:
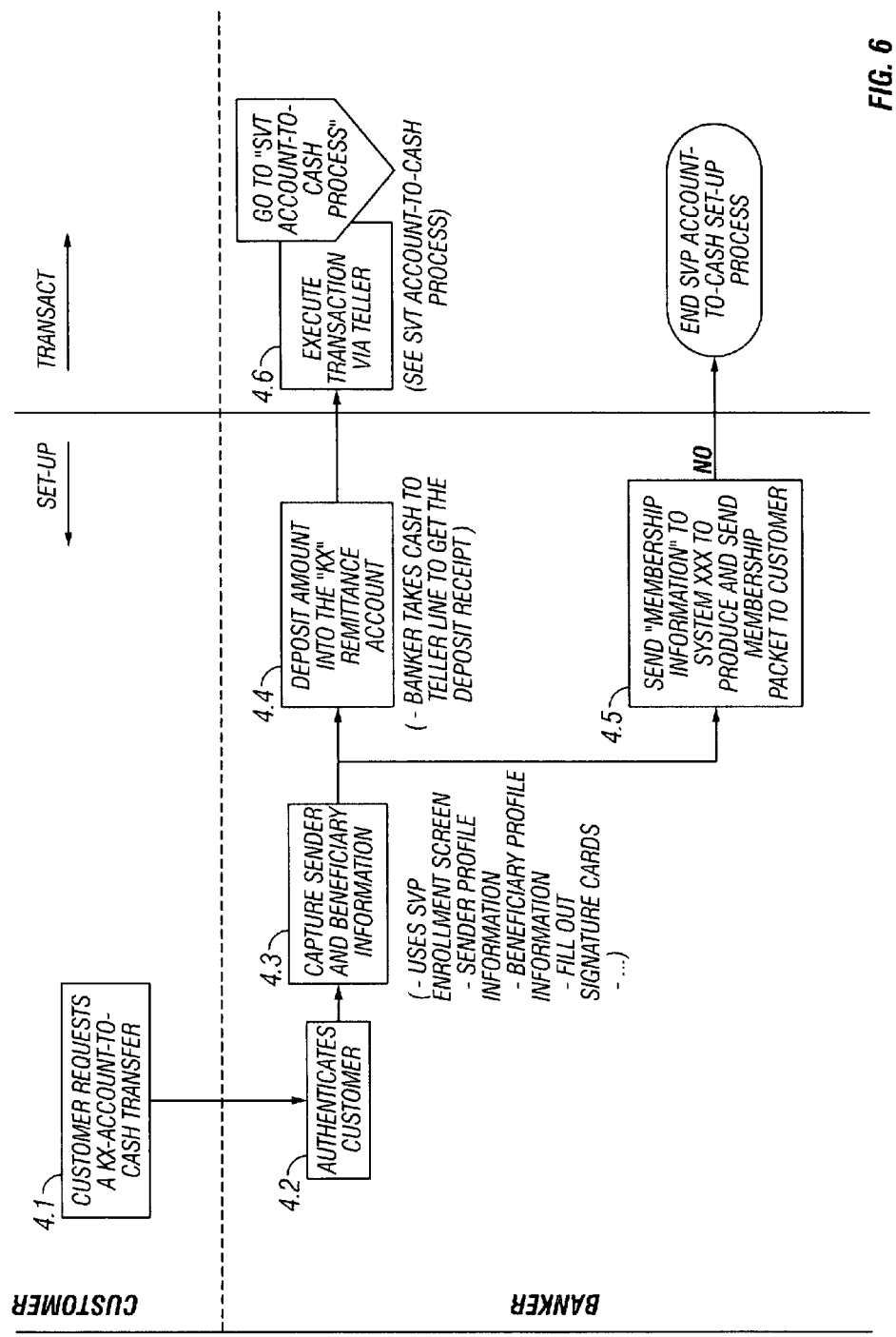
FIG. 6 is a flow chart showing an account-to-cash set-up process according to the invention.

An Exemplary Store Vision Platform (SVP) Remittance-Account-to-Cash Set-Up Process One embodiment of the invention is described with respect to the following scenario and can be described with reference to FIG. 6. The following scenario is meant by way of example only for ease of understanding and is not meant to be limiting.

Triggering Event(s)

In one embodiment of the invention, a triggering event can be described as an enterprise account holder entering an environment, such as a retail store, that uses SVT. The account holder requests an account-to-cash transfer.

Assumption(s):

According to an embodiment of the invention any of the follow can be assumed:

The enterprise will set up an enterprise remittance account from which funds can be accessed for transfer.
An SVP entity, such as a banker, performs the set-up.
An SVT entity, such as a teller, performs the actual transaction.

Process Flow

A customer requests a remittance account-to-cash transfer 4.1.

An enterprise entity, which for ease of understanding is referred to herein as banker, authenticates the customer 4.2.

The banker captures sender and beneficiary information 4.3. by way of example, captured information is provided as follows:

Uses SVP enrollment screen;
Sender profile information;
Beneficiary profile information; and
Fill out signature cards.

The banker deposits the amount into the remittance account 4.4. In one embodiment of the invention, the banker takes cash to the teller line to get a deposit receipt. The banker executes the transaction using the teller as needed 4.6 and control goes to the SVT account-to-cash process described hereinabove.

In addition, the banker sends membership information to one or more various internal systems that produce and send a membership packet to the customer 4.5. In one embodiment of the invention, the customer is sent a card. The SVP account-to-cash set-up process ends.

An Exemplary Store Vision Platform (SVP) Cash-to-Account Set-Up Process

Figure 7:
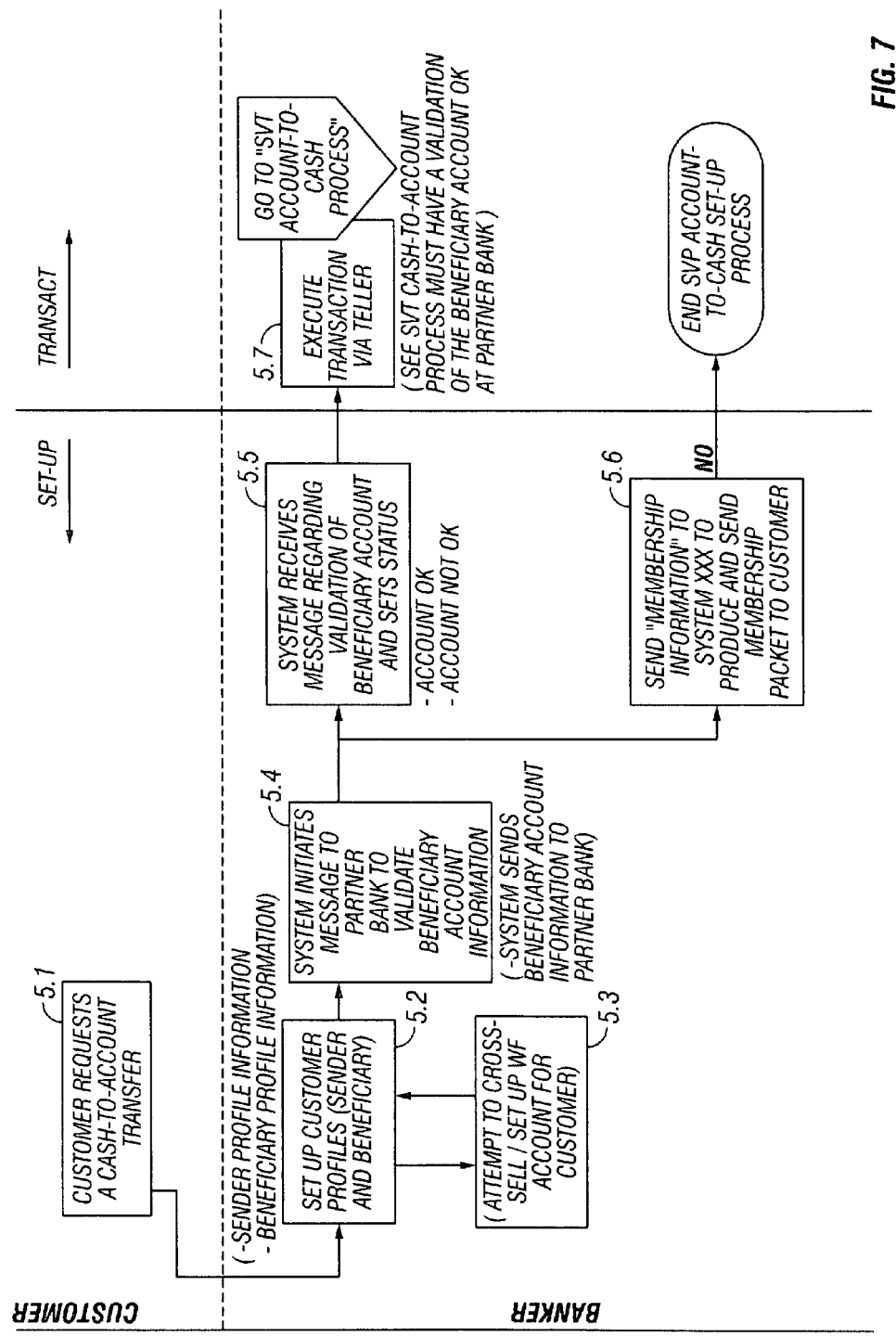
FIG. 7 is a flow chart showing a cash-to-account set-up process according to the invention.

One embodiment of the invention is described with respect to the following scenario and can be described with reference to FIG. 7. The following scenario is meant by way of example only for ease of understanding and is not meant to be limiting.

Triggering Event(s)

In one embodiment of the invention, a triggering event can be described as an enterprise account holder entering an environment, such as a retail store, that uses SVT. The account holder requests a cash-to-account transfer.

Assumption(s):

According to an embodiment of the invention any of the follow can be assumed:

The enterprise entity, referred to herein as a banker, verifies beneficiary account with a partner bank.
The status of validation is kept on the SVT beneficiary profile.
The SVP banker performs the set-up process.
The teller on SVT performs the transfer transaction.

Process Flow

A customer requests a cash-to-account transfer 5.1.

The banker sets up a customer profile, containing sender profile and beneficiary profile information 5.2.

In one embodiment of the invention, the enterprise can attempt to cross-sell and/or set up an enterprise account for the customer 5.3.

The system initiates and sends a message to the partner bank to validate the beneficiary account information 5.4, where the message includes the beneficiary account information.

The system receives a message regarding validation of the beneficiary account and sets a status indicator 5.5. For example, the status indicator can reflect: account OK or account not OK.

The set-up process initiates executing the transaction by way of using the teller 5.7. Control then goes to the SVT cash-to-account process described hereinabove.

In addition, the banker sends membership information to one or more various internal systems that produce and send a membership packet to the customer 5.6. In one embodiment of the invention, the customer is sent a card. The SVP cash-to-account set-up process ends.

An Exemplary Phone Bank Remittance Account Set-Up Process

Figure 8:
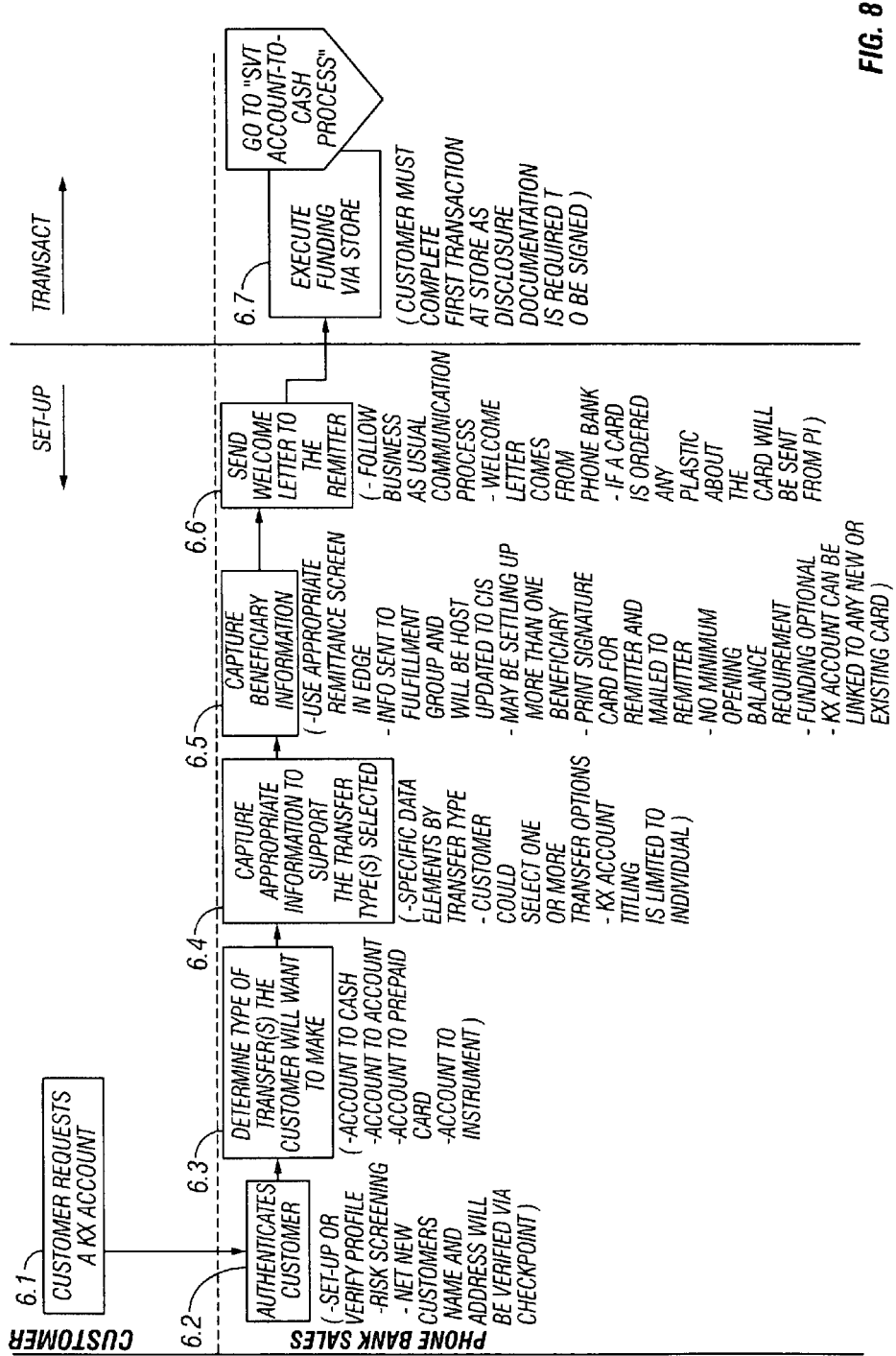
FIG. 8 is a flow chart showing an account set-up process according to the invention.

One embodiment of the invention is described with respect to the following scenario and can be described with reference to FIG. 8. The following scenario is meant by way of example only for ease of understanding and is not meant to be limiting.

Triggering Event(s)

A triggering event is an enterprise customer calling a predetermined number, such as an 800 number, to establish a new remittance account.

Constraint(s):

If the customer is an non-resident alien (NRA) customer who does not have social security as well as no existing relationship with the enterprise, the customer is referred to go into an actual store.

Assumption(s):

A host system update process can take from one to three business days.

Process Flow

A customer requests a remittance account, also referred to herein as a KX remittance account, 6.1 over the phone.

An individual or representative in the enterprise's phone bank sales department or the like authenticate the customer 6.2. For example, the representative can perform the following:

Set-up or verify the customer's profile.
    Perform risk screening on new customers.
    Verify customer's name and address via an internal system or third party system, such as CheckPoint.

The representative determines the type of transfer(s) customer desires 6.3. Examples of types of transfers are as follows:

Account-to-cash;
    Account-to-account;
    Account-to-prepaid card; and
    Account to instrument.

The representative captures appropriate information to support the transfer type(s) selected 6.4. By way of example, some information captured is as follows:

Specific data elements by transfer type.
    Customer can select one or more transfer option.
    The remittance account title is limited to INDIVIDUAL.
    The representative captures beneficiary information 6.5.

Some embodiment of further processing is as follows:

The representative uses the appropriate remittance screen in a subsystem used by the representative.
    The beneficiary information is sent to a fulfillment group to be host updated to CIS, a subsystem.
    One or more beneficiaries can be set-up.
    Print signature card for remitter and provide it to the remitter, such as for example, by mail.
    No minimum opening balance is required.
    Funding optional.
    The KX remittance account can be linked to any new or existing card.

The representative sends a welcome letter to the remitter 6.6 and the business communication process proceeds as usual. It should be appreciated that in one embodiment of the invention, the phone bank sends the letter whereas the card, if ordered, is sent by the appropriate subsystem or third party vendor.

Control is then passed for proceeding with a transaction to the SVT account-to-cash process 6.7 described herein. In one embodiment of the invention the customer completes the first transaction at the store because a signed disclosed documentation is required.

An Exemplary Phone Bank Remittance Account Transfer Process

Figure 9A:
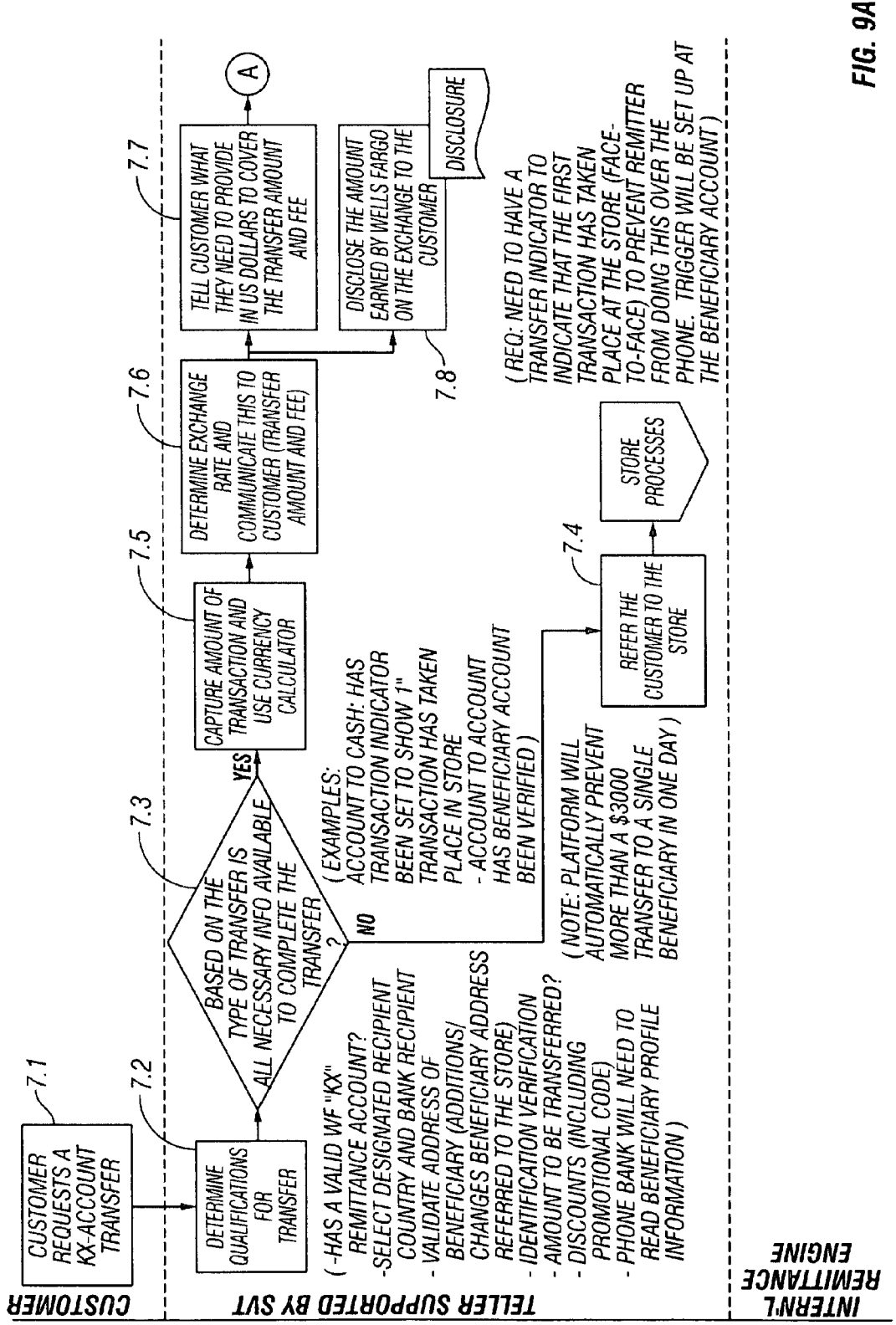
FIGS. 9A-9C show a flow chart showing a phone bank account transfer process according to the invention.
Figure 9B:
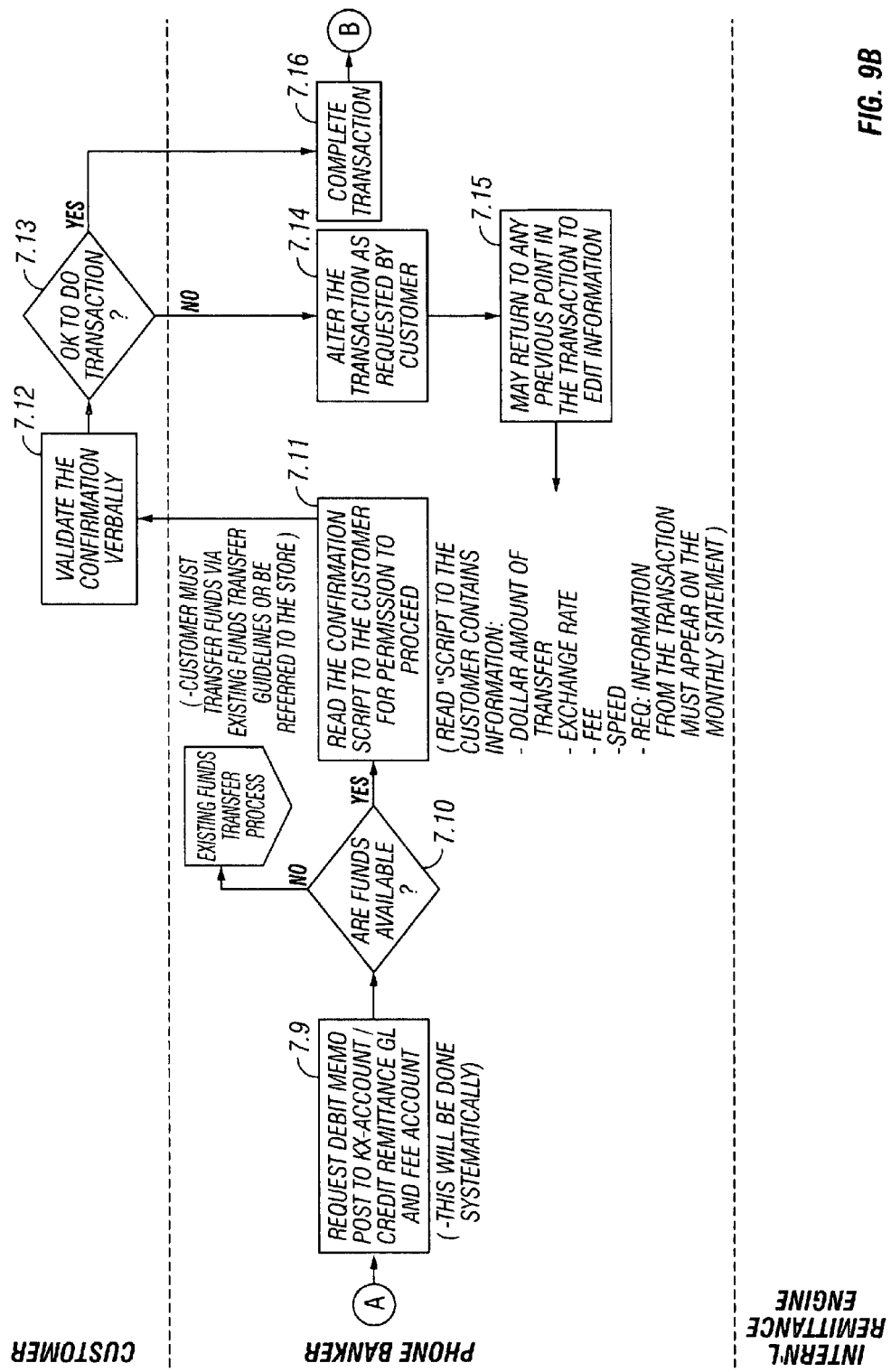
Figure 9C:
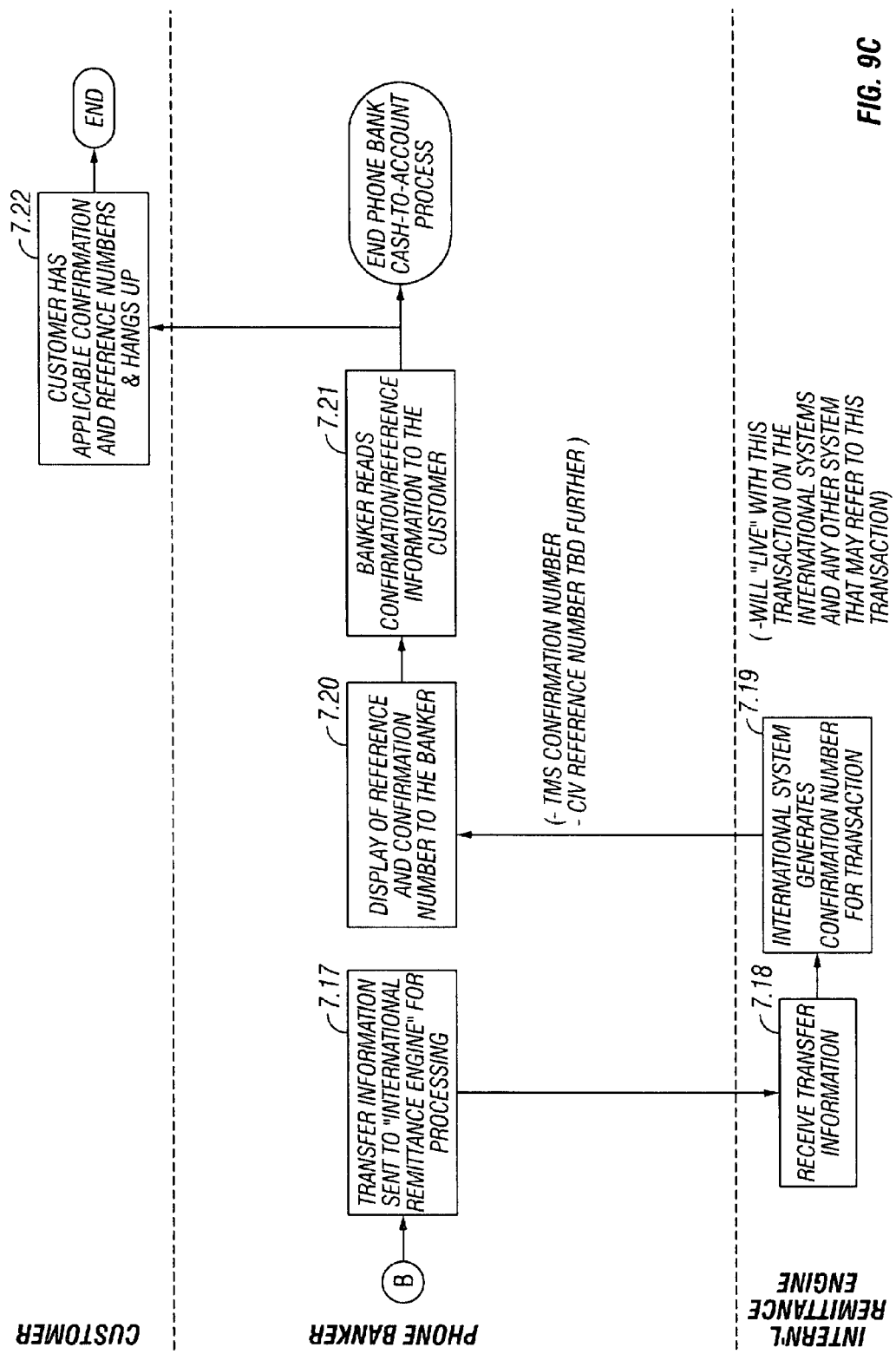

One embodiment of the invention is described with respect to the following scenario and can be described with reference to FIG. 9. The following scenario is meant by way of example only for ease of understanding and is not meant to be limiting.

Triggering Event(s)

An enterprise customer calls into a predetermined number, such as an 800 number. The customer has been previously set up with a KX account for remittance.

Assumption(s)

The remitter has completed a face-to-face transaction in the store. This only applies to the first transaction. Subsequent transactions can be done via phone or other designated channels when available in the future.

The banker/system can systematically validate that the first transaction took place.

Any transfers requested after a predetermined time, such as for example, 8 pm are processed the next business day.

Process Flow

A customer requests a KX-account transfer 7.1.

The enterprise banker or system determines the qualifications for the transfer 7.2. Examples of such qualifications are as follows:

Does the customer have a valid enterprise KX remittance account?
    The customer selects a designated recipient country and bank recipient.
    The system or banker validates the address of the beneficiary and any additions or changes are referred to the store.
    Verify identification.
    Determine amount to be transferred.
    Any discounts to be applied, including promotional codes?
    In one embodiment of the invention, the phone bank reads the beneficiary profile information.
    In one embodiment of the invention the platform automatically prevents more than a maximum amount, for example, $3000, transfer to a single beneficiary in a single day.

The banker determines if all the necessary information is gathered, based on the type of transfer 7.3. For example, if it is an account-to-cash transfer, a determination of has the transaction indicator been set to show a first transaction has taken place in the store? Another example is for an account-to-account transfer, has the beneficiary account been verified?

If not, the banker refers the customer to the store 7.4 and the store proceeds further processing.

If yes, the banker captures the amount of the transaction and uses a currency calculator 7.5.

The banker determines the exchange rate and communicates this as well as the transfer amount and the fee to the customer 7.6.

The banker informs the customer what the customer needs to provide in US dollars to cover the transfer amount and the fee 7.7. As well, the banker discloses the amount earned by the enterprise on the exchange to the customer 7.8.

The phone banker requests a debit memo post to the KX-account, which credits remittance to GL and fee account automatically 7.9.

The phone banker determines if funds are available 7.10.

If not, control is passed to an existing funds transfer process. That is, the customer must transfer funds via existing funds transfer guidelines or be referred to the store.

If yes, then a confirmation script is provided to, such as read to, the customer for permission to proceed 7.11. Examples of what the script contains is as follows:
Dollar amount of transfer;
Exchange rate;
Fee; and
Spread.

In one embodiment of the invention, information from the transaction appears on a financial system's monthly statement.

The customer validates the confirmation, for example, verbally 7.12.

The customer determines if it is okay to proceed with the transaction 7.13. If not, then the phone banker alters the transaction as requested by the customer 7.14. Control may return to any previous point in the transaction process to edit the information 7.15.

If yes, then the transaction process continues 7.16 for completion. The phone banker sends transfer information to the International Remittance Engine (IRE) for processing 7.17.

The IRE receives the transfer information 7.18 and the international system generates a confirmation number for the transaction 7.19. It should be appreciated that the international system stores the transaction as well as any other subsystem stores the transaction for further reference.

The IRE sends the confirmation number to the phone banker to for display 7.20. It should be appreciated that there are other confirmation numbers used as reference numbers for other enterprise systems and subsystems as necessary or when desired.

The phone banker provides, such as reads, the confirmation and reference information to the customer 7.21.

The customer, having the confirmation and reference numbers can hang up the phone. The phone bank cash-to-account process ends.

Outputs

Following are some example outputs according to one or more embodiments of the invention. Such list is by no means exhaustive:
Compliance information has been communicated to the customer.
The customer has verbally received the applicable confirmation and reference numbers.
Data is transferred to the IRE for creation of the confirmation number.
Transaction in stored in the IRE for further processing.
Transaction data appear on monthly KX account statements.

Figure 10:
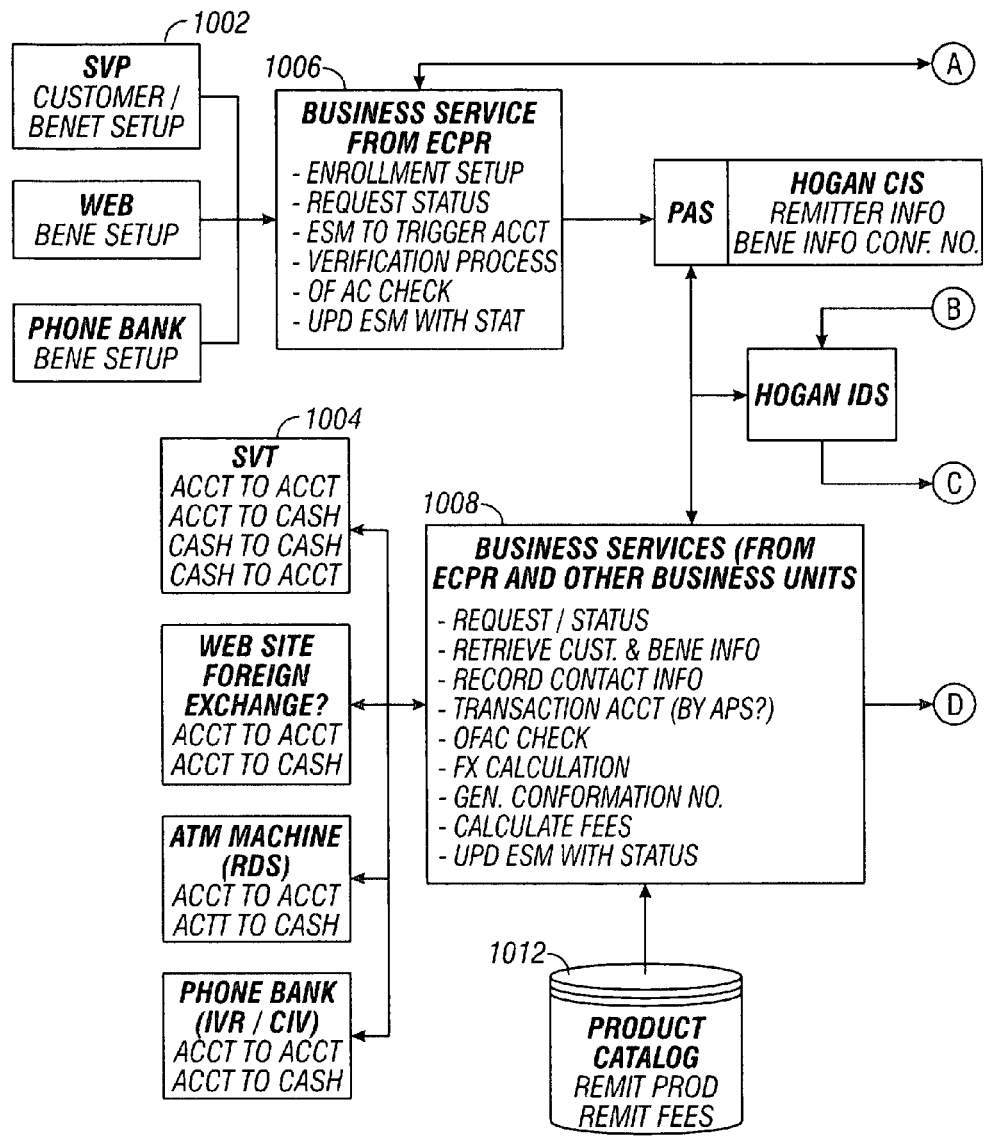
FIG. 10 is a schematic diagram of a global remittance architecture according to the invention.
Figure 10:
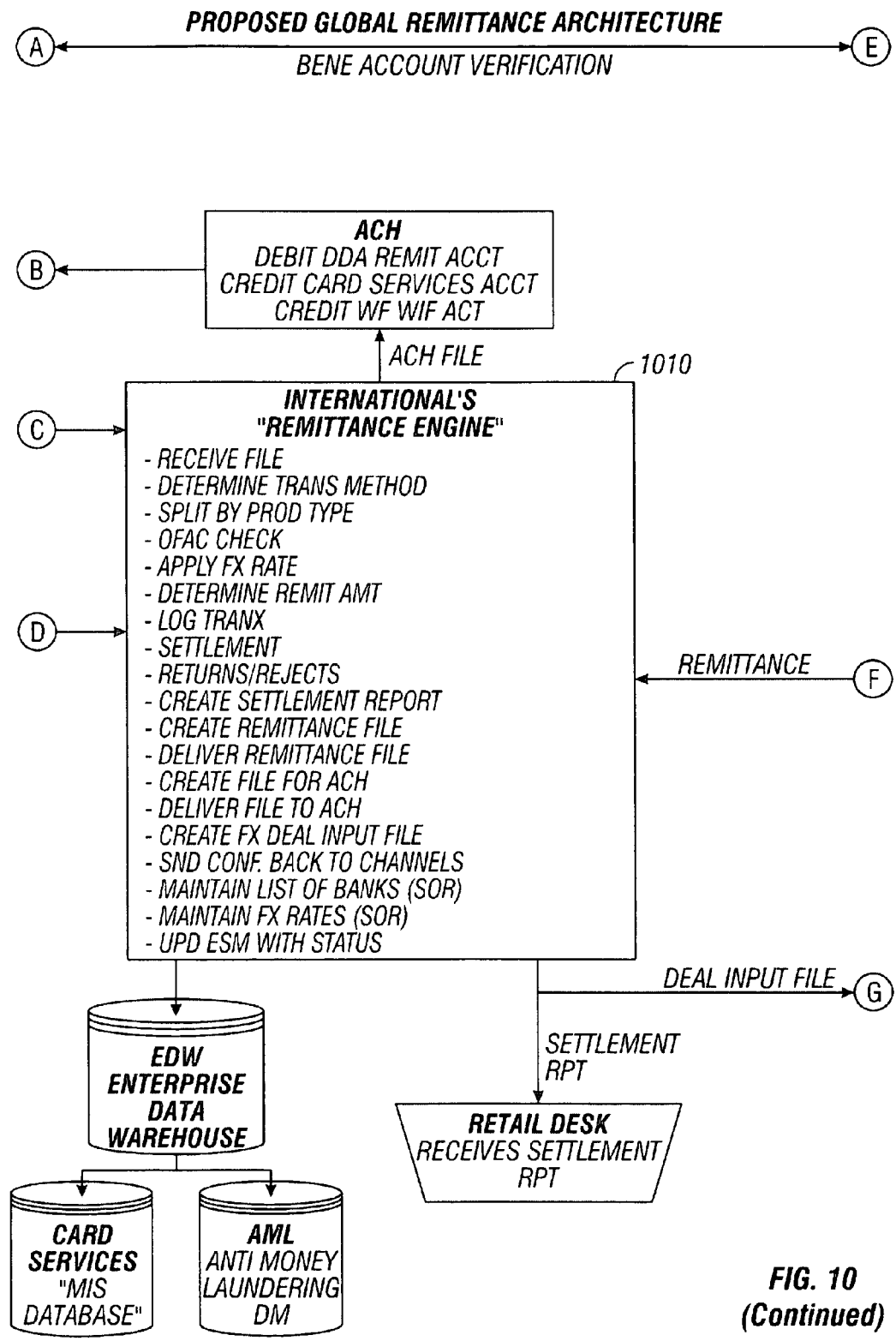
Figure 10:
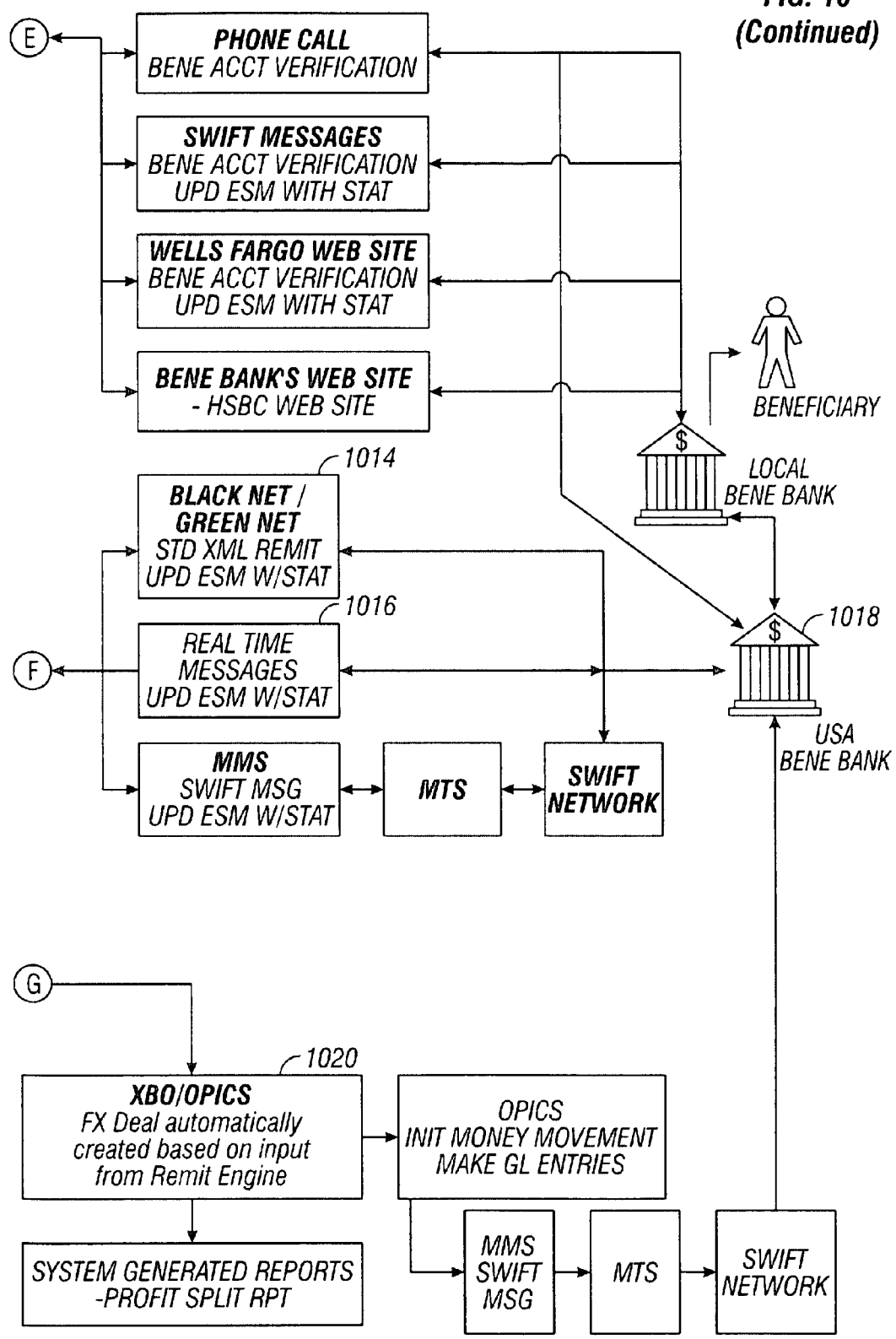

One embodiment of the invention can be described with reference to FIG. 10, a schematic diagram showing the main components of the invention. In particular, SVP 1102 system performs customer and beneficiary set up. SVT 1004 performs anything to anything transactions. Business services 1006 provides enrollment set up, request status, verification process, and other related functions as shown. Business services 1008 for SVT provides request/status, retrieve customer and beneficiary information, record contract information, transaction account, FX calculation, generate confirmation number, calculate fees, and the like as shown. The IRE 1010 performs the many functions as shown, e.g. determine transaction method, apply FX rate, create FX deal input file, maintain list of banks, and the like as shown. A product catalogue 1012 is maintained and linked to the SVT business services 1008. Remittance messages are sent to the enterprise bank 1018 using XML 1014. Real time messages 1016 are sent to and received from the enterprise bank 1018. A deal subsystem 1020 provides ability for automatic FX Deal creation based on input from the IRE.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A system that remits funds from a remitter to a beneficiary, the system being provided by an enterprise, the system comprising:
at least one of a store vision teller system (SVT) and a phone bank component for receiving and transmitting transaction data for a remittance transaction;
a database configured to store account data for bank accounts associated with account holders;
an enterprise financial system that receives said transaction data from either said SVT and said phone bank component and that processes said transaction data and outputs processed transaction data;
a remittance network member account that receives and stores said processed transaction data to reconcile and settle said remittance transaction;
an international remittance engine (IRE) that receives and processes said processed transaction data to create a first output file in a predetermined message format and to output said first output file to an external remittance network member system;
an enterprise remittance general ledger system that receives a second output file from said IRE and uses said second output file to send a reconcile and settlement message to said remittance network member account for reconcilement and settlement; and
a demand deposit account that receives funds associated with said remittance transaction from said enterprise remittance general ledger system resulting in funds being available in said external remittance network member system;
wherein the system is configured to support a plurality of types of remittance transactions, including cash-to-cash, account-to-cash, cash-to-account, and account-to-account remittance transactions; and
wherein for account-to-account and account-to-cash transactions, the funds are retrieved from one of the bank accounts; and
wherein for account-to-cash transactions, the account-to-cash transaction is not anchored to a particular account of the beneficiary and the beneficiary does not have an account with the enterprise.

2. The system of claim 1, wherein the IRE maintains and provides information related to countries comprising:
country;
bank;
currency supported; and
methods available to receive funds.

3. The system of claim 1, wherein the IRE comprises:
a foreign exchange calculator; and
a remittance modeling service that supports remittance message exchange with said external remittance network member system.

4. The system of claim 1, wherein said predetermined message format can be any of:
proprietary to said enterprise;
SFT; and
SWIFT.

5. The system of claim 1, wherein said SVT is configured such that:
in account-to-anything products, a disclosure is added to a consumer account agreement booklet and a consumer account fee and information schedule, and an annual privacy policy is distributed in accordance with requirements for all types of accounts;
in anything-to-anything products at remittance, a disclosure is provided to and signed by a remitter for each individual remittance, printed in both English and the customer's preferred language; and
in cash-to-anything products, a new service agreement form at enrollment is provided for privacy and terms and conditions, available in English and in the customer's preferred language as a separate enclosure provided to the remitter at the time of enrollment.

6. The system of claim 1, wherein
for account-to-account, a remitter can send money at any time during the day to a remittance network member bank beneficiary account or send regularly scheduled payments to said beneficiary account;
for account-to-cash, a remitter can send money at any time during the day to remittance network member bank for cash pick up and multiple beneficiaries can be set up on said account to receive cash;
for account-to-instrument, a remitter can send money at any time during the day to remittance network member bank for payment via negotiable instrument and multiple beneficiaries can be set up on said account to receive negotiable instruments; and
for account to Card, a remitter can send money at any time during the day to a remittance network member bank to be given to a beneficiary in a form of some prepaid card issued by said remittance network member bank and multiple beneficiaries can be set up on said account to receive cards.

7. The system of claim 1, wherein the at least one of the SVT and phone bank component, enterprise financial system, remittance member network account, IRE, enterprise remittance general ledger system, and the demand deposit account are all provided as part of an integrated remittance enterprise.

8. The system of claim 1, wherein the at least one of the SVT and phone bank component provides the remitter with an amount earned by the integrated remittance enterprise in conjunction with the remittance transaction.

9. A method that remits funds from a remitter to a beneficiary, comprising the steps of:
maintaining a bank account for the remitter at a bank, the bank associated with an enterprise;
providing at least one of a store vision teller system (SVT) and a phone bank component for receiving and transmitting transaction data for a remittance transaction;
providing an enterprise financial system that receives said transmitted remittance transaction data from either said SVT and said phone bank component and that processes said transaction data and outputs said processed transaction data;
providing a remittance network member account that receives and stores said processed transaction data to reconcile and settle said remittance transaction;
providing an international remittance engine (IRE) that receives and processes said processed transaction data to create a first output file in a predetermined message format and to output said first output file to an external remittance network member system;
providing an enterprise remittance general ledger system that receives a second output file from said IRE and uses said second output file to send a reconcile and settlement message to said remittance network member account for reconcilement and settlement; and
providing a demand deposit account that receives funds associated with said remittance transaction from said enterprise remittance general ledger system resulting in funds being available in said external remittance network member system;
wherein the IRE is configured to support a plurality of types of remittance transactions, including cash-to-cash, account-to-cash, cash-to-account, and account-to-account remittance transactions; and
wherein for account-to-cash and account-to-account transactions, the funds are retrieved from the bank account of the remitter; and
wherein for account-to-cash transactions, the account-to-cash transaction is not anchored to a particular account of the beneficiary and the beneficiary does not have an account with the enterprise.

10. The method of claim 9, wherein the IRE maintains and provides information related to countries comprising:
country;
bank;
currency supported; and
methods available to receive funds.

11. The method of claim 9, wherein the IRE comprises:
a foreign exchange calculator; and
a remittance modeling service that supports remittance message exchange with said external remittance network member system.

12. The method of claim 9, wherein said predetermined message format can be any of:
proprietary to said enterprise;
SFT; and
SWIFT.

13. The method of claim 9, wherein said SVT is configured such that:
in account-to-anything products, a disclosure is added to a consumer account agreement booklet and a consumer account fee and information schedule, and an annual privacy policy is distributed in accordance with requirements for all types of accounts;
in anything-to-anything products at remittance, a disclosure is provided to and signed by a remitter for each individual remittance, printed in both English and the customer's preferred language; and
in cash-to-anything products, a new service agreement form at enrollment is provided for privacy and terms and conditions, available in English and in the customer's preferred language, as a separate enclosure provided to the remitter at the time of enrollment.

14. The method of claim 9, wherein for account-to-account, a remitter can send money at any time during the day to a remittance network member bank beneficiary account or send regularly scheduled payments to said beneficiary account;

for account-to-cash, a remitter can send money at any time during the day to remittance network member bank for cash pick up and multiple beneficiaries can be set up on said account to receive cash;

for account-to-instrument, a remitter can send money at any time during the day to remittance network member bank for payment via negotiable instrument and multiple beneficiaries can be set up on said account to receive negotiable instruments; and for account to Card, a remitter can send money at any time during the day to a remittance network member bank to be given to a beneficiary in a form of some prepaid card issued by said remittance network member bank and multiple beneficiaries can be set up on said account to receive cards.

15. A method for remitting funds from a remitter to a beneficiary, comprising:

maintaining a bank account for a remitter at a bank, the bank associated with an enterprise;

receiving transaction data for a remittance transaction;

generating a first reconcile and settlement message using a remittance engine based on the transaction data and storing the first reconcile and settlement message in a database associated with the bank;

generating a second reconcile and settlement message based on the transaction data and storing the second reconcile and settlement message in the database;

reconciling the first and second reconcile and settlement messages; and upon reconciling the first and second reconcile and settlement messages, making the funds available to the beneficiary;

wherein the funds are retrieved from the bank account of the remitter and provided to the beneficiary in the form of cash; and wherein the remittance transaction is not anchored to a particular account of the beneficiary and the beneficiary does not have an account with the enterprise.

16. The method of claim 15, further comprising:

disclosing an amount earned by a remittance agent in conjunction with the remittance transaction to the remitter.

17. A method of remitting funds from a remitter to a beneficiary, comprising:

maintaining a bank account for the remitter, the remitter being a customer of a bank, the bank being associated with an enterprise;

providing the remitter with a plurality of options for a remittance transaction to remit the funds, the options including an account-to-cash remittance transaction, an account-to-account remittance transaction, a cash-to-cash remittance transaction, and a cash-to-account remittance transaction;

receiving instructions from the remitter relating to the remittance transaction, the instructions including a selection of the account-to-cash option;

withdrawing funds from the bank account of the remitter based on the instructions;

transferring the funds to the beneficiary using a computer network;

storing transaction data for the remittance transaction in a database; and providing a transaction disclosure receipt that provides details regarding the remittance transaction based on the transaction data;

wherein the remittance transaction is not anchored to a particular account of the beneficiary and the beneficiary does not have an account with the enterprise.

18. A method according to claim 17, wherein the instructions are received by a computer-implemented teller system.

19. A method according to claim 17, wherein the computer-implemented teller system is operated by a human bank teller.

\* \* \* \* \*

UNITED STATES PATENT AND TRADEMARK OFFICE
CERTIFICATE OF CORRECTION

| | | |
|---|---|---|
| PATENT NO. | : 8,407,140 B2 | Page 1 of 1 |
| APPLICATION NO. | : 11/260962 | |
| DATED | : March 26, 2013 | |
| INVENTOR(S) | : Ayala et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1258 days.

Signed and Sealed this
Twenty-eighth Day of October, 2014

Michelle K. Lee
*Deputy Director of the United States Patent and Trademark Office*